United States Patent
Deshe et al.

(10) Patent No.: US 11,061,600 B2
(45) Date of Patent: Jul. 13, 2021

(54) TIERED STORAGE DATA EVACUATION WITHIN SOLID STATE DEVICES

(71) Applicant: Western Digital Technologies, Inc., San Jose, CA (US)

(72) Inventors: Noga Deshe, Raanana (IL); Gadi Vishne, Petach-Tikva (IL)

(73) Assignee: WESTERN DIGITAL TECHNOLOGIES, INC., Sa, CA (US)

( * ) Notice: Subject to any disclaimer, the term of this patent is extended or adjusted under 35 U.S.C. 154(b) by 76 days.

(21) Appl. No.: 16/245,070

(22) Filed: Jan. 10, 2019

(65) Prior Publication Data
US 2019/0220218 A1 Jul. 18, 2019

Related U.S. Application Data

(60) Provisional application No. 62/617,092, filed on Jan. 12, 2018.

(51) Int. Cl.
*G06F 3/06* (2006.01)

(52) U.S. Cl.
CPC ............ *G06F 3/0649* (2013.01); *G06F 3/061* (2013.01); *G06F 3/0616* (2013.01); *G06F 3/0659* (2013.01); *G06F 3/0679* (2013.01)

(58) Field of Classification Search
CPC ...... G06F 3/0649; G06F 3/061; G06F 3/0616; G06F 3/0659; G06F 3/0679; G06F 3/0685; G06F 3/0608; G06F 3/0611; G06F 3/0613; G06F 3/0614; G06F 3/0617; G06F 3/064; G06F 3/0646; G06F 3/0688; G06F 3/068; G06F 12/12; G06F 12/121; G06F 12/128; G06F 12/127; G06F 12/126
See application file for complete search history.

(56) References Cited

U.S. PATENT DOCUMENTS 8,244,984 B1 * 8/2012 Glasco ................ G06F 12/0804
711/133
9,047,017 B1 * 6/2015 Dolan .................... G06F 3/0653
(Continued)

OTHER PUBLICATIONS

NVM Express; "Non-Volatile Memory Express" Revision 1.3a, dated Oct. 24, 2017; 287 pages.

*Primary Examiner* — Michael Krofcheck
(74) *Attorney, Agent, or Firm* — Loza & Loza, LLP; Gabriel Fitch

(57) ABSTRACT

Exemplary methods and apparatus are disclosed to select data evacuation policies for use by a solid state device (SSD) to relocate data from an upper (high performance) memory tier to a lower memory tier. The upper tier may be, e.g., a single-layer cell (SLC) tier of a multi-tier NAND memory, whereas the lower tier may be, e.g., a triple-layer cell (TLC) or a quad-level cell (QLC) tier of the NAND memory. In one example, the SSD monitors its recent input/output (I/O) command history. If a most recent command was a read command, the SSD performs a "lazy" evacuation procedure to evacuate data from the upper tier storage area to the lower tier storage area. Otherwise, the SSD performs a "greedy" or "eager" evacuation procedure to evacuate the data from the upper tier to the lower tier. Other evacuation selection criteria are described herein based, e.g., upon predicting upcoming I/O commands.

20 Claims, 19 Drawing Sheets

(56) References Cited

U.S. PATENT DOCUMENTS

| | | | | |
|---|---|---|---|---|
| 9,733,980 B1* | 8/2017 | Khan | ................... | G06F 9/4856 |
| 2013/0265825 A1* | 10/2013 | Lassa | ................... | G06F 3/0649 |
| | | | | 365/185.11 |
| 2015/0032921 A1* | 1/2015 | Malkin | ................ | G06F 3/0685 |
| | | | | 710/74 |
| 2015/0199138 A1* | 7/2015 | Ramachandran | ... | G06F 12/0246 |
| | | | | 711/103 |
| 2015/0347040 A1* | 12/2015 | Mathur | ................ | G06F 3/0679 |
| | | | | 711/103 |
| 2016/0246726 A1* | 8/2016 | Hahn | ................... | G06F 3/0659 |
| 2016/0274797 A1* | 9/2016 | Hahn | ...................... | G06F 3/061 |
| 2018/0232178 A1* | 8/2018 | Iwaki | ................... | G06F 3/0679 |
| 2019/0188125 A1* | 6/2019 | Lin | ....................... | G06F 3/0652 |

* cited by examiner

TIERED STORAGE DATA EVACUATION WITHIN SOLID STATE DEVICES

CLAIM OF PRIORITY UNDER 35 U.S.C. § 119

The present Application for patent claims priority to Provisional Application No. 62/617,092, entitled "TIERED STORAGE OPTIMIZATION FOR SPECIFIC USER WORKLOADS," filed Jan. 12, 2018, which is assigned to the assignee hereof and hereby expressly incorporated by reference herein.

FIELD

Aspects of the disclosure relate generally to solid state devices, and more specifically, to data relocation/evacuation in multi-tiered solid state devices based on specific user workloads.

INTRODUCTION

In a variety of consumer electronics, solid state devices (SSDs) incorporating non-volatile memories (NVMs) are often replacing or supplementing conventional rotating hard disk drives for mass storage. NVMs may include one or more flash memory devices, each of which may be logically divided into blocks, and each of the blocks may be further logically divided into addressable pages. The addressable pages may be any of a variety of sizes (e.g., 512 Bytes, 1 Kilobytes, 2 Kilobytes, 4 Kilobytes), which may or may not match the logical block address sizes used by a host computing device.

SSDs may include multiple tiers of storage with different performance and endurance characteristics and/or different costs. SSD products may include single-level cell (SLC) and triple-level cell (TLC) layers, and products are being developed that may include quad-level cell (QLC) layers or storage class memory (SCM) layers. As part of flash management, incoming data is often written to a high-performance tier (such as SLC) and then relocated to a lower-performing tier (such as TLC). This relocation process may be referred to as evacuation.

Issues can arise in the evacuation (relocation) of data within such SSDs. Various aspects of the methods and apparatus disclosed herein address these and other issues.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage apparatus that includes: a non-volatile memory (NVM) comprising a first tier storage area and a second tier storage area; an input component configured to input storage commands for applying to the NVM; and a processor coupled to the NVM and the input component and configured to determine a type of a storage command applied to the NVM, relocate at least some data stored in the first tier storage area to the second tier storage area in accordance with a first data relocation policy in response to a determination that the storage command is of a first type, and relocate at least some data stored in the first tier storage area to the second tier storage area in accordance with a second data relocation policy in response to a determination that the storage command is of a second type.

Another embodiment of the disclosure provides a method for evacuating data from a first tier storage area to a second tier storage area of a solid state device (SSD). The method includes: determining whether an input/output (I/O) command is of a first command type or of a second command type; evacuating data from the first tier storage area to the second tier storage area in accordance with a first evacuation policy in response to a determination that the I/O command is of the first command type; and evacuating data from the first tier storage area to the second tier storage area in accordance with a second evacuation policy in response to a determination that the I/O command is of the second command type.

Yet another embodiment of the disclosure provides an apparatus for use with an SSD. The apparatus includes: means for determining if one or more I/O commands for processing by the SSD were or will be read commands; means, operative in response to a determination that the one or more I/O commands were or will be read commands, for relocating data from the first tier storage area to the second tier storage area in accordance with a first policy; and means, operative in response to a determination that the one or more I/O commands were not or will not be read commands, for relocating data from the first tier storage area to the second tier storage area in accordance with a second evacuation policy.

DETAILED DESCRIPTION

Figure 1:
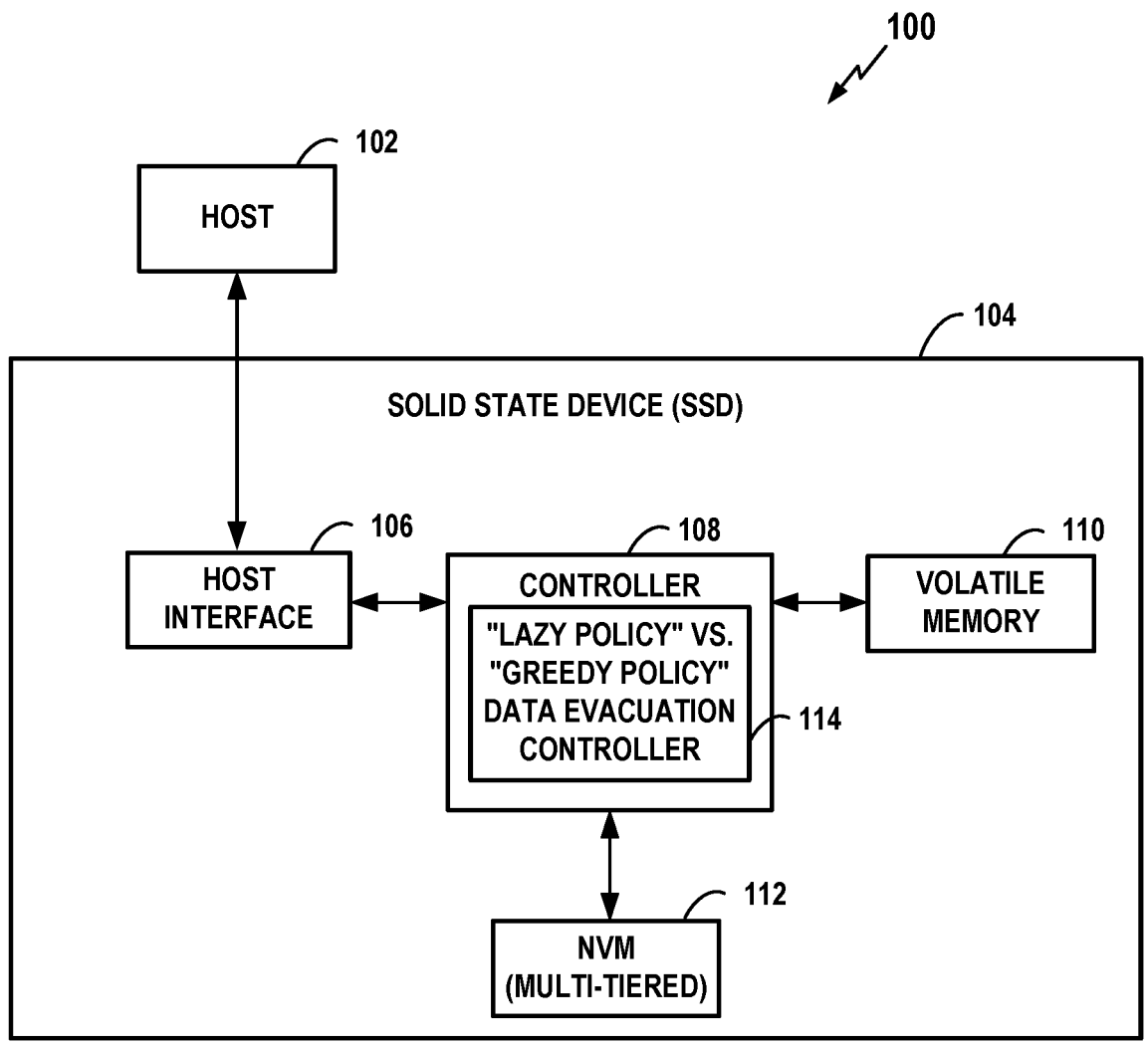
FIG. 1 is a block diagram of a solid state device (SSD) configured for multi-tiered data evacuation a non-volatile memory (NVM) in accordance with an aspect of the disclosure where different evacuation policies may be employed based, for example, on user workload.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The main examples herein relate to data storage devices or apparatus having persistent or non-volatile memory (NVM) arrays, and in particular to solid state devices (SSDs) having tiered NAND flash memory arrays (herein "NANDs"). A NAND is a type of non-volatile storage technology that does not require power to retain data. The NAND exploits negative-AND logic, i.e. NAND-based logic. A tiered memory, as that term is used herein, is a memory that has at least two different types of memory elements with different performance characteristics, such as different access speeds and/or different endurance characteristics. For example, the memory may have one storage area of single level cells (SLC) and another area of triple-level cells (TLC). With SLC, one bit is stored per cell. With TLC, three bits are stored per cell.

Generally speaking, SLC elements have higher (better) performance than TLC elements (but SLC has higher costs).

Another form of memory is a quad level cell (QLC) that stores four bits per cell. QLC is relatively slow and inexpensive. Herein, for generality, the term multi-level cell (MLC) is meant to include any cell that stores two or more bits (and so the term encompasses TLC and QLC). It is noted that some of the literature uses the term MLC to refer specifically to cells that store two and only two bits. Herein, MLC includes such 2-bit cells, as well as TLC and QLC. The tier with higher (or highest) performance is referred to herein as an upper (or uppermost) tier, whereas the tier with lower (or lowest) performance is referred herein to as a lower (or lowest) tier. Multiple tiers or levels may be provided in an SSD, such as an NVM array with SLC, TLC and QLC storage areas.

For the sake of brevity, an SSD having one or more tiered NANDs will be used below in the description of various embodiments. It should be understood that at least some aspects described herein may be applicable to other forms of data storage devices as well. For example, at least some aspects described herein may be applicable to phase-change memory (PCM) arrays, magneto-resistive random access memory (MRAM) arrays and resistive random access memory (ReRAM) arrays, as well as to storage devices with storage class memory (SCM) layers.

Overview

As noted above in the Introduction, issues can arise in the evacuation (relocation) of data within SSDs. Evacuation from one tier to another may be guided by a policy set within the device controller. In a simple case, data may be evacuated using a "lazy" policy, which moves data from high-performance to low-performance tiers only on demand, while optimizing for localized reads of hot data. As understood by those skilled in the NVM art, "hot" data is a term of art that refers to data written or updated (thus requiring write access) often or frequently, such as directory information. "Cold" data is all other data, i.e., data not often or frequently written or updated, such as program code. Cold data might be written once or infrequently but read frequently. Thus, it is the frequency of write access that distinguishes hot data from cold data.

In another case, data instead may be evacuated using a "greedy" or "eager" evacuation policy to more aggressively or more promptly move data to a low-performance tier in order to achieve higher write performance, at the possible expense of lower read performance for data which was evacuated. Herein, a "greedy" evacuation or relocation policy is a policy that is relatively more aggressive or more prompt than a "lazy" evacuation or relocation policy. The "lazy" evacuation or relocation policy is thus a policy that is relatively less aggressive or less prompt than the "greedy" evacuation or relocation policy. (The term greedy is used, for example, to suggest that the device grabs as much data from the upper tier as it can for transference to the lower tier as soon as it can. The term lazy is used, for example, to suggest that the device waits as long as possible before moving data from the upper tier to a lower tier.)

A greedy policy may employ or comprise the more prompt or more frequent evacuation of data from an upper tier to a lower tier, whereas the lazy policy may employ or comprise less frequent and less prompt evacuation of data from the upper tier to the lower tier. In some examples, the greedy procedure evacuates data as soon as possible, whereas the lazy procedure waits to evacuate data until actually necessary to make room for incoming write data. Various other examples of lazy vs. greedy criteria are discussed below.

In some devices, the evacuation of data might be triggered only based on idle time between commands. In other words, if a long sequence of writes occurs, the writes start in the highest tier, and continue to lower tiers only after saturating the upper tiers with data. This may be accomplished either directly or indirectly through a small buffer in the upper tier memory array. During idle time, an evacuation policy may either completely (or mostly) clear the highest tier, or may perform a minimal evacuation in order to allow for acceleration of short bursts of future write activity. These approaches may not perform well for certain types of data/workloads. Herein, "workload" generally refers to a set of commands provided by the user via a host device, which may vary depending upon whether the commands are mostly reads or writes, or whether the commands are mostly sequential or non-sequential (e.g. random).

Herein, methods and apparatus are described where evacuation is instead driven by workloads rather than just idle time, such that a user (host) device may benefit from optimal (or at least enhanced) performance that is aligned, for example, with upcoming command sequences. For example, methods and apparatus are disclosed herein that do not just distinguish between greedy/lazy evacuation procedures or policies but that also intelligently select the evacuation procedure or policy to be used based on information representative of workload, such as on recent sequences of read and write commands, or predictions of future read or write commands.

In some examples described below, an exemplary method is provided for evacuating data from a first tier storage area to a second tier storage area of an SSD, where the second tier storage area stores more bits per memory element than the first tier storage area. The exemplary method includes: monitoring a recent input/output command history of the SSD; performing, if a most recent command was a read command, a lazy evacuation procedure to evacuate data from the first tier storage area to the second tier storage; and performing, if the most recent command was not a read command, a greedy evacuation procedure to evacuate data from the first tier storage area to the second tier storage area. In one aspect, the second tier storage area stores an equal number of bits, or even fewer bits, per memory element than the first tier storage area. In such case, the second tier storage area uses a different memory element design and/or structure than that of the first tier storage area and is generally less expensive than that of the first tier storage area. In one aspect, the second tier storage area is larger than the first tier storage area, and uses a different memory element design and/or structure than the first tier storage area.

Illustrative Embodiments

FIG. 1 is a block diagram of an SSD that can perform data evacuation in a multi-tiered NVM in accordance with one aspect of the disclosure. The system 100 includes a host 102 and an SSD 104 coupled to the host 102. The host 102 provides commands to the SSD 104 for transferring data between the host 102 and the SSD 104. For example, the host 102 may provide a write command to the SSD 104 for writing data to the SSD 104 or a read command to the SSD 104 for reading data from the SSD 104. The host 102 may be any system or device with a compatible interface for communicating with the SSD 104. For example, the host 102 may be a computing device, a personal computer, a portable computer, or workstation, a server, a personal digital assistant, a digital camera, a digital phone, or the like.

The host 102 and the SSD 104 may be configured to operate in accordance with NVM express (NVMe) protocols. NVMe is a scalable host controller interface designed for use with Peripheral Component Interconnect (PCI) Express-based SSDs. See, e.g., the NVM Express standard, Revision 1.3a, Oct. 24, 2017. With NVMe, a host device writes data storage device commands, such as read commands, write commands, and administrative commands, into submission queues that are implemented in host memory. The controller of an NVM storage device fetches the commands from the host submission queues, executes the commands, and posts entries in completion queues, which are also implemented in host memory, to thereby notify the host device of the completion of the commands.

The SSD 104 includes a host interface 106, a controller 108, a volatile memory 110, and an NVM 112. The host interface 106 is coupled to the controller 108 and facilitates communication between the host 102 and the controller 108. Additionally, the controller 108 is coupled to the memory 110 and the NVM 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host 102 includes the SSD 104. In other embodiments, the SSD 104 is remote with respect to the host 102 or is contained in a remote computing system coupled in communication with the host 102. For example, the host 102 may communicate with the SSD 104 through a wireless communication link.

The controller 108 controls operation of the SSD 104. The controller 108 receives commands from the host 102 through the host interface 106 and performs or executes the commands to transfer data between the host 102 and the NVM 112. The controller 108 may include any type of processing device, such as a microprocessor, microcontroller, embedded controller, logic circuit, software, firmware, or the like, for controlling operation of the SSD 104.

In some embodiments, some or all of the functions described herein as being performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host 102. In some embodiments, some or all of the functions described herein as being performed by the controller 108 may instead be performed by another element such as a controller in a hybrid drive including both non-volatile memory elements and magnetic storage elements.

The volatile memory 110 may be any memory, computing device, or system capable of storing data in a manner that is not necessarily persistent. For example, the volatile memory 110 may be random-access memory (RAM), dynamic RAM (DRAM), static RAM (SRAM), synchronous dynamic RAM (SDRAM), flash storage, erasable programmable read-only-memory (EPROM), electrically erasable programmable ROM (EEPROM), or the like. In various embodiments, the controller 108 uses the volatile memory 110, or a portion thereof, to store data during the transfer of data between the host 102 and the NVM 112. For example, the volatile memory 110 or a portion of the volatile memory 110 may be a cache memory.

The NVM 112 receives data from the controller 108 and stores the data within its storage elements or arrays. The NVM 112 may be any type of multi-tiered NVM, such as a suitably-equipped flash storage system, a solid state drive, a flash memory card, a secure digital (SD) card, a universal serial bus (USB) memory device, a CompactFlash card, a SmartMedia device, a flash storage array, or the like. The multi-tiered NVM has at least two storage tiers (not shown in FIG. 1) where one of the storage tiers stores fewer bits than the other storage tiers (or at least stores fewer bits per unit area than the other storage tiers, e.g. SLC vs. TLC).

The controller 108 or NVM 112 can be configured to perform any of the processes described herein for evacuating or relocating data within the multi-tiered NVM 112. As shown in FIG. 1, the exemplary controller 108 includes a "lazy policy" vs. "greedy policy" data evacuation controller 114, which chooses a particular evacuation policy to use based, for example, on whether or not the most recent commands received from the host 102 are read commands.

Figure 2:
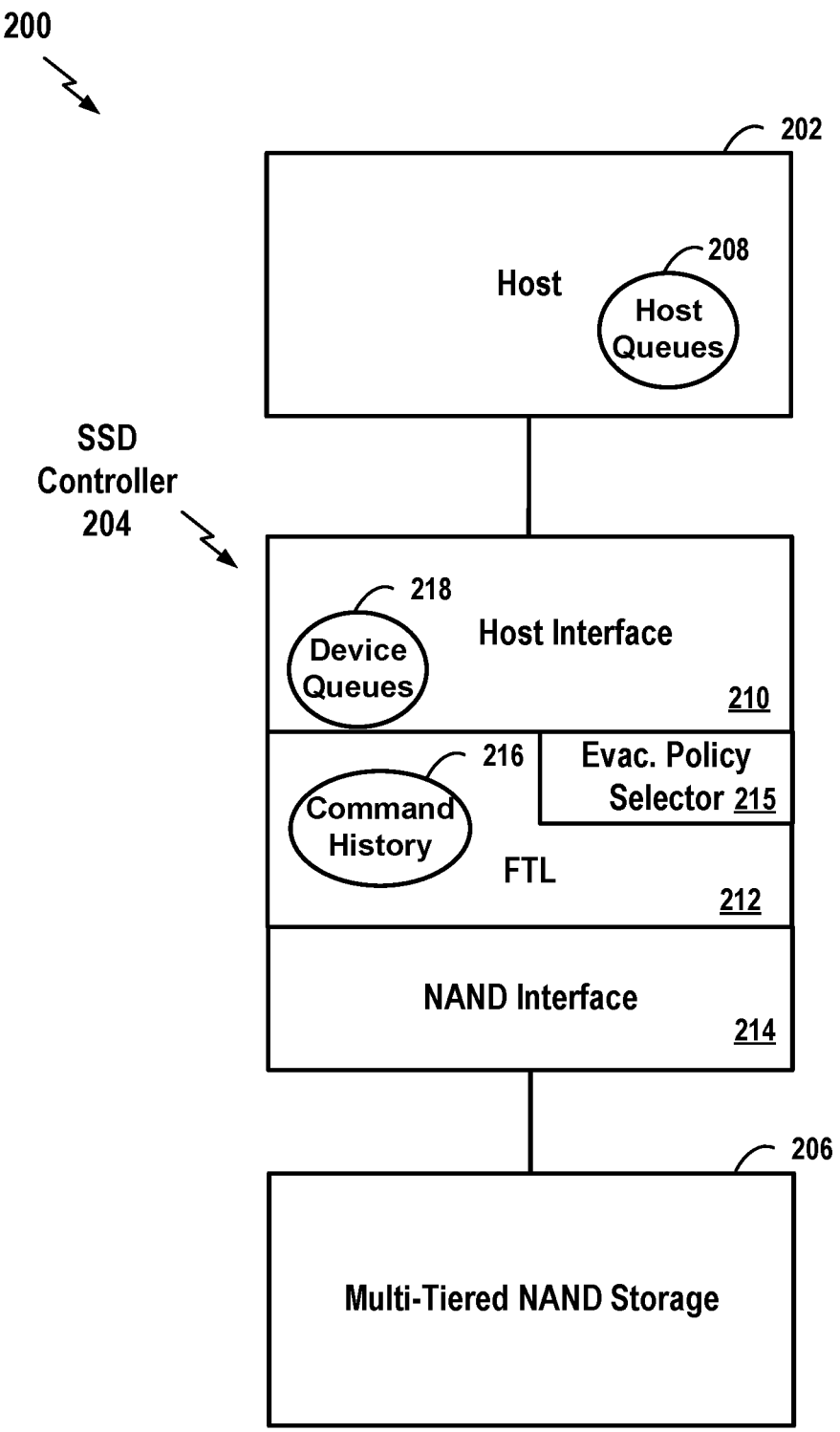
FIG. 2 is a block diagram of a system including a host, an SSD controller, and a multi-tiered NVM, where the controller is configured in accordance with one aspect of the disclosure to select different evacuation policies based, for example, on command history.

FIG. 2 is a block diagram of a system 200 that includes a host 202, an SSD controller 204, and a multi-tiered NAND storage 206, where the SSD controller 204 is configured to perform data evacuation within the multi-tiered NAND 206. In the example of FIG. 2, the host 202 includes host queues 208, which may be accessible by the SSD controller 204. The SSD controller 204 has a host interface 210, a flash translation layer (FTL) 212, and a NAND interface 214. In one aspect, evacuation procedures described herein can be stored in and/or performed in or by or in conjunction with the FTL 212. An evacuation policy selector (or evaluator) 215 of the FTL 212 is configured to select a particular evacuation policy (e.g. a lazy vs. greedy policy) for use by the FTL 212 to control evacuation of data from one layer to another within the NAND 206 during maintenance procures or when otherwise appropriate. The FTL 212 may store a command history 216, which records or maintains a list of host commands that have been received and executed. The host interface 210 may include one or more device queues 218.

In a particular example, the host interface 210 of the SSD 204 fetches input/output (I/O) commands from the host queues 208 and stores the commands (such as read and write commands) in its device queues 218. The SSD controller 204 executes the commands by accessing the NAND 206 via the NAND interface 214. A record of the commands is stored in the command history 216 and suitable completion notifications are sent back to the host 202 via the host interface 210. Eventually, when data evacuation is to be performed, the SSD controller 204 examines the command history 216 to determine, for example, if the most recent commands were read commands. If so, the evacuation policy selector 215 selects or activates the lazy (e.g. relatively non-aggressive) evacuation policy and performs the evacuation of data from an upper tier to a lower tier within the NAND 206 in accordance with the lazy policy. If the most recent commands in the command history are writes instead of reads, the evacuation policy selector 215 instead selects or activates the greedy (e.g. relatively aggressive) evacuation policy and performs the evacuation of data from the upper tier to the lower tier within the NAND 206 in accordance with the greedy policy. Examples of particular lazy and greedy policies are described below.

In other examples, the selection of the evacuation policy by selector 215 may be based instead on such factors as (a) whether the recent commands in the command history 216 are sequential commands or random commands or (b) whether the commands involve a logical block address (LBA) overlap. In still other examples, the SSD controller 204 may predict or otherwise determine future commands that will be received from the host 202 and select the evacuation policy accordingly. Predictions may be made, for example, based on machine learning, pattern identification, heuristics, and/or by obtaining hints from the host within the metadata of a command. (For NVMe, metadata may be encoded within an I/O command by the host device). In other cases, the SSD controller 204 instead determines (rather than predicts) the type of future commands by examining the host queues 208 to identify commands that have not yet been sent by the host 202 but will be sent in due course. In one aspect, the I/O queues to be examined may be on the device side or the host side, and the examination step may be performed immediately upon entering maintenance mode or during the maintenance window.

Figure 3:
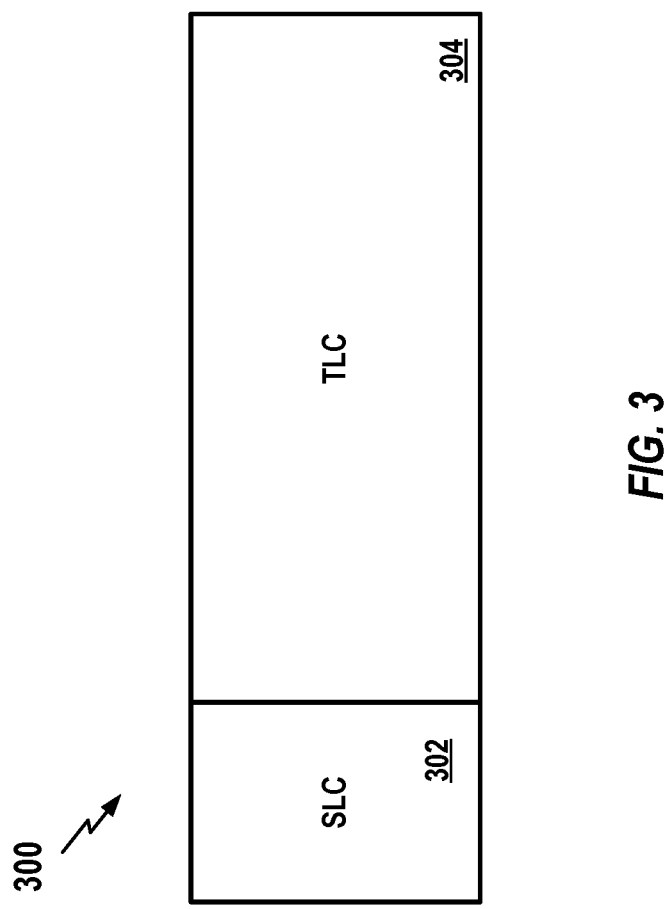
FIG. 3 is a block diagram of a two tiered NVM configured in accordance with one aspect of the disclosure, within which data evacuation may be employed.

FIG. 3 is a block diagram of a two-tiered NVM 300 in accordance with one aspect of the disclosure. The NVM 300 includes a first (upper) tier storage area 302 that consists of SLC elements or arrays and a second (lower) tier storage 304 area that consists of TLC elements or arrays or other multi-layer cell (MLC) elements or arrays. Herein, MLC is intended to include TLC, quad-layer cells (QLCs), or other technologies that are denser than SLC. The data evacuation controlled by the SSD controller 204 of FIG. 2 may be performed to move data from the SLC area 302 to the TLC area 304 in accordance with the selected evacuation policy. Note that, within FIG. 3, the MLC area is much larger than the SLC area, and hence can store far more data. Evacuation of data to MLC is performed, in part, because the SLC area is relatively small.

Figure 4:
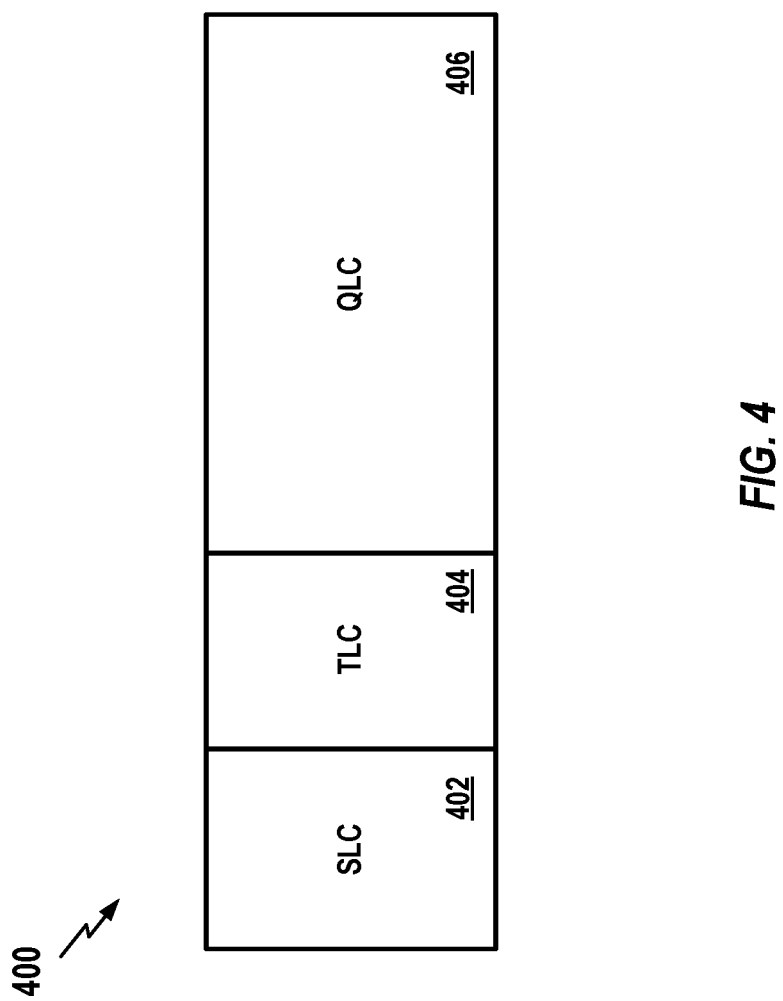
FIG. 4 is a block diagram of a three tiered NVM in accordance with another aspect of the disclosure, within which data evacuation may be employed.

FIG. 4 is a block diagram of a three-tiered NVM 400 in accordance with an aspect of the disclosure. The NVM 400 includes a first (upper) tier storage area 402 that consists of SLCs, a second (middle) tier storage area 404 that consists of TLCs, and a third (lower) tier storage area that consists of QLCs. The data evacuation controlled by the SSD controller 204 of FIG. 2 may be performed to move data from the SLC area 402 to the TLC area 404 and then to the QLC layer 406 in accordance with the selected evacuation policy. In still other examples, an NVM may include more than three tiers.

Figure 5:
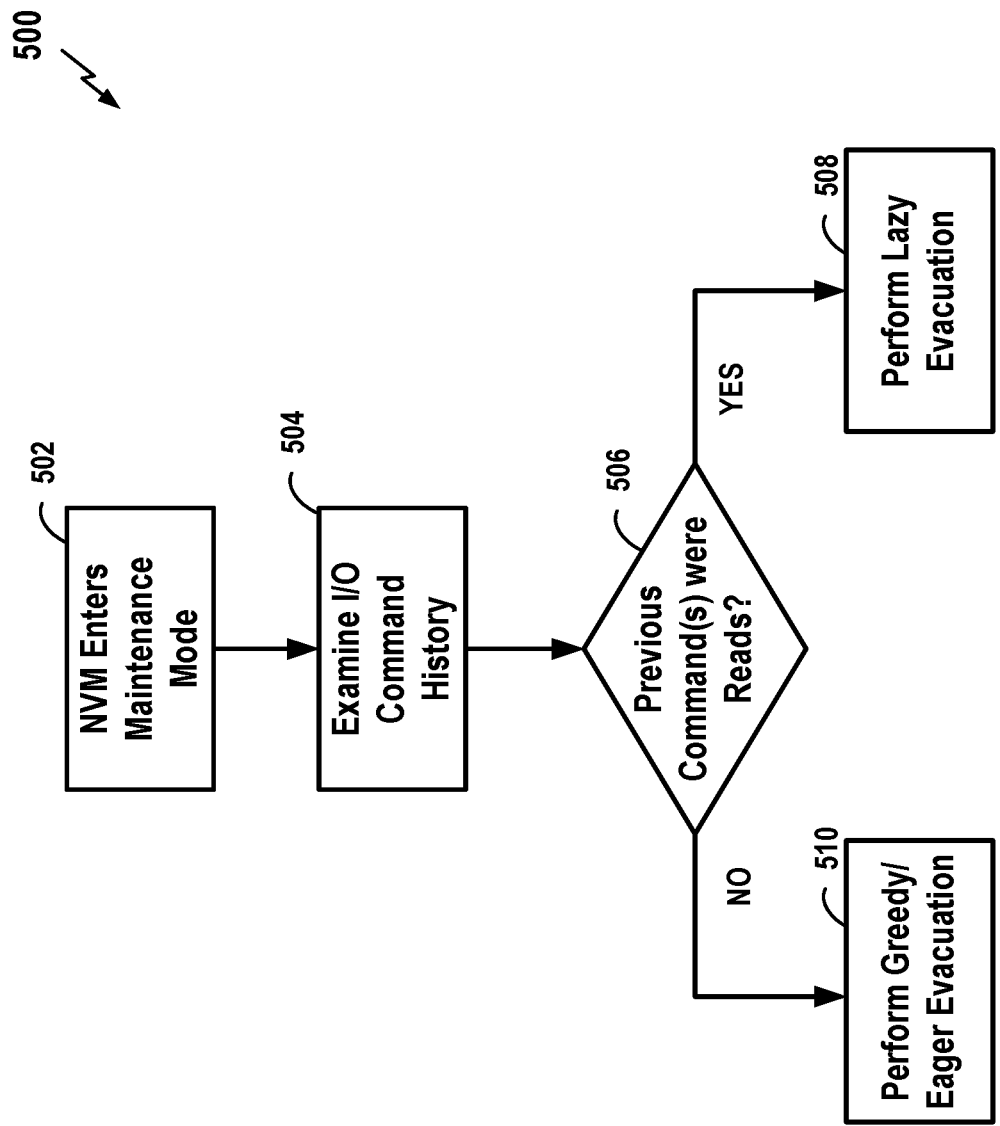
FIG. 5 is a flow chart of a process for performing evacuation based on I/O command history in accordance with one aspect of the disclosure where "lazy" evacuation is performed if one or more previous commands were read commands, such as the most-recent command.

FIG. 5 is a flow chart of an exemplary process 500 for performing evacuation based on I/O command history in accordance with one aspect of the disclosure. As shown, the process begins when the SSD enters an NVM maintenance mode as indicated by block 502. The SSD controller examines/monitors the I/O command history as indicated by block 504. If the most recent command was a read, as determined at decision block 506, the SSD performs lazy evacuation (e.g., the process uses the lazy evacuation policy) as indicated by block 508. If on the other hand, the most recent command was not a read, then the SSD performs greedy evacuation (e.g., the process uses the greedy/eager evaluation policy) as indicated by block 510. The actual evacuation may be performed by the NVM of the SSD based on the selected evacuation policy.

With the method of FIG. 5, a workload that mostly provides read commands will mostly result in lazy evacuation, which, in turn, results in more reads from the upper tier (because the data remains in the upper tier longer before being evacuated to a lower tier). This can be beneficial for performance, since reads are faster when using an upper tier memory (such as SLC) rather than a lower tier memory (such as TLC). Conversely, a workload that mostly provides write commands will mostly result in greedy evacuation, which, in turn, results in data being moved more promptly to the lower tier where there is often more room for data due to the larger size of the lower tier memory. This helps prevent the upper tier from overflowing (which can cause various busses and queues to overflow as well, resulting in performance delays). The benefits gained by evacuating data more promptly from the upper tier may exceed performance losses arising due to the need to then read data from the lower tier. And so, generally speaking, performance benefits can be gained (at least statistically or on the average) using the evacuation policy selection procedure of FIG. 5, even if only the most recent command is used to select between lazy and greedy evacuation. As can be appreciated, more sophisticated procedures may be employed that take into account, for example, sequences or reads and writes or the locality of reads and writes based on their LBAs, and such alternatives are discussed below.

Figure 6:
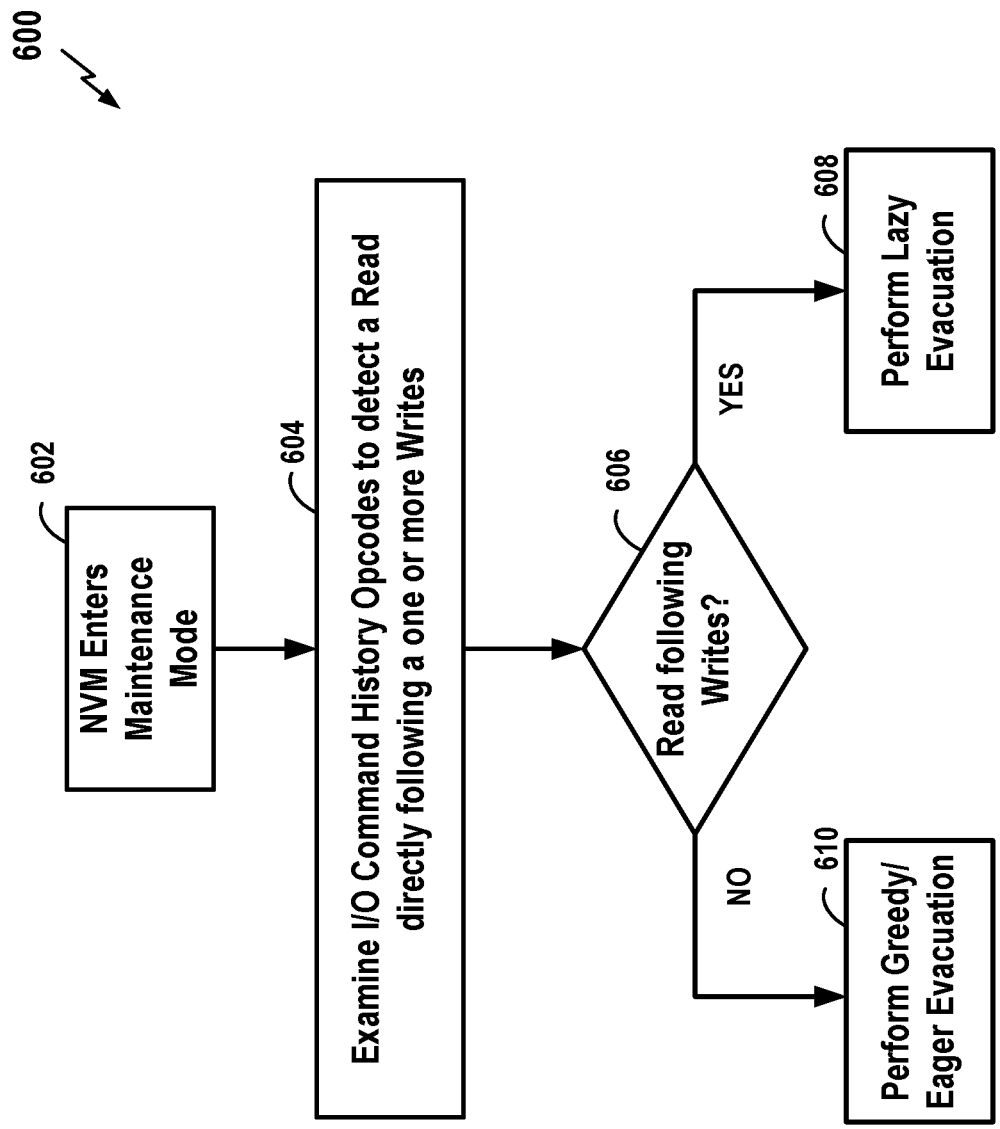
FIG. 6 is a flow chart of a process for performing evacuation based on I/O command history in accordance with another aspect of the disclosure where lazy evacuation is performed if one or more recent read commands followed one or more write commands.

FIG. 6 illustrates an alternative wherein the SSD examines the sequence of commands immediately or directly following one or more writes. The process again begins when the SSD enters an NVM maintenance mode as indicated by block 602. The SSD controller examines/monitors operational codes (opcodes) within commands stored within the I/O command history as indicated by block 604 to detect a read immediately or directly following one or more writes. If a read follows a write, as determined at decision block 606, the SSD performs lazy evacuation as indicated by block 608. Otherwise, the SSD performs greedy evacuation (as indicated by block 610.

Figure 7:
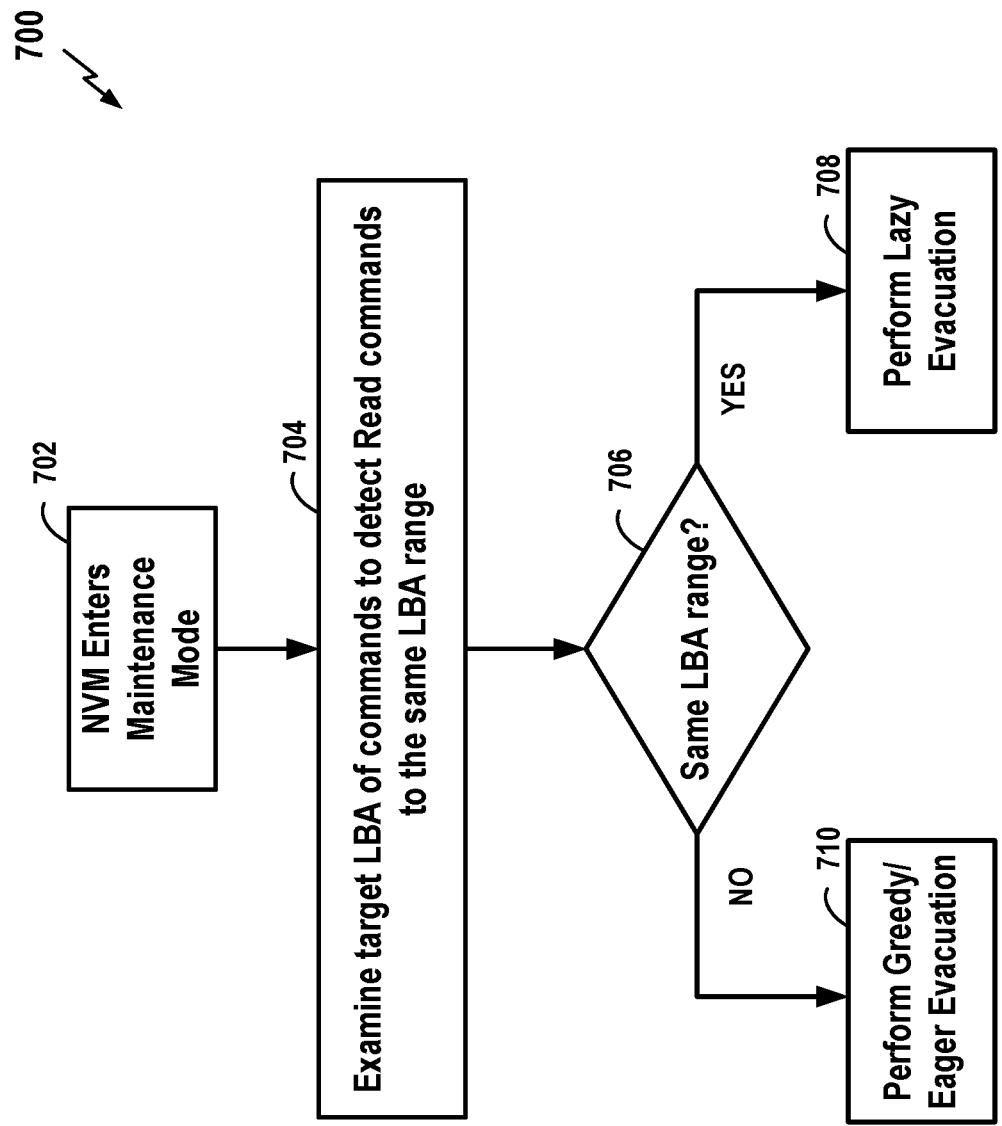
FIG. 7 is a flow chart of a process for performing evacuation based on I/O command history in accordance with another aspect of the disclosure where target logical block addresses (LBAs) are examined to determine if recent read commands are in the same LBA range.

FIG. 7 illustrates an alternative wherein the SSD examines the target LBA, such that if the commands are read commands to the same address range, the evacuation policy will retain the data corresponding to these reads. The process again begins when the SSD enters an NVM maintenance mode as indicated by block 702. The SSD controller examines/monitors the target LBA of commands as indicated by block 704 to detect one or more reads to the same LBA range. If the latest read is to the same LBA range as previous reads, as determined at decision block 706, the SSD performs lazy evacuation as indicated by block 708 so as to retain the data corresponding to these reads in the higher tier memory. Otherwise, the SSD performs greedy evacuation, as indicated by block 710. In this regard, for reads to the same LBA range, it is more efficient to retain the data in the higher tier (in accordance with lazy evacuation) where the reads are faster, than to promptly evacuate the data to the lower tier (in accordance with greedy/eager evacuation), which would result in reads from the lower (slower) tier.

Figure 8:
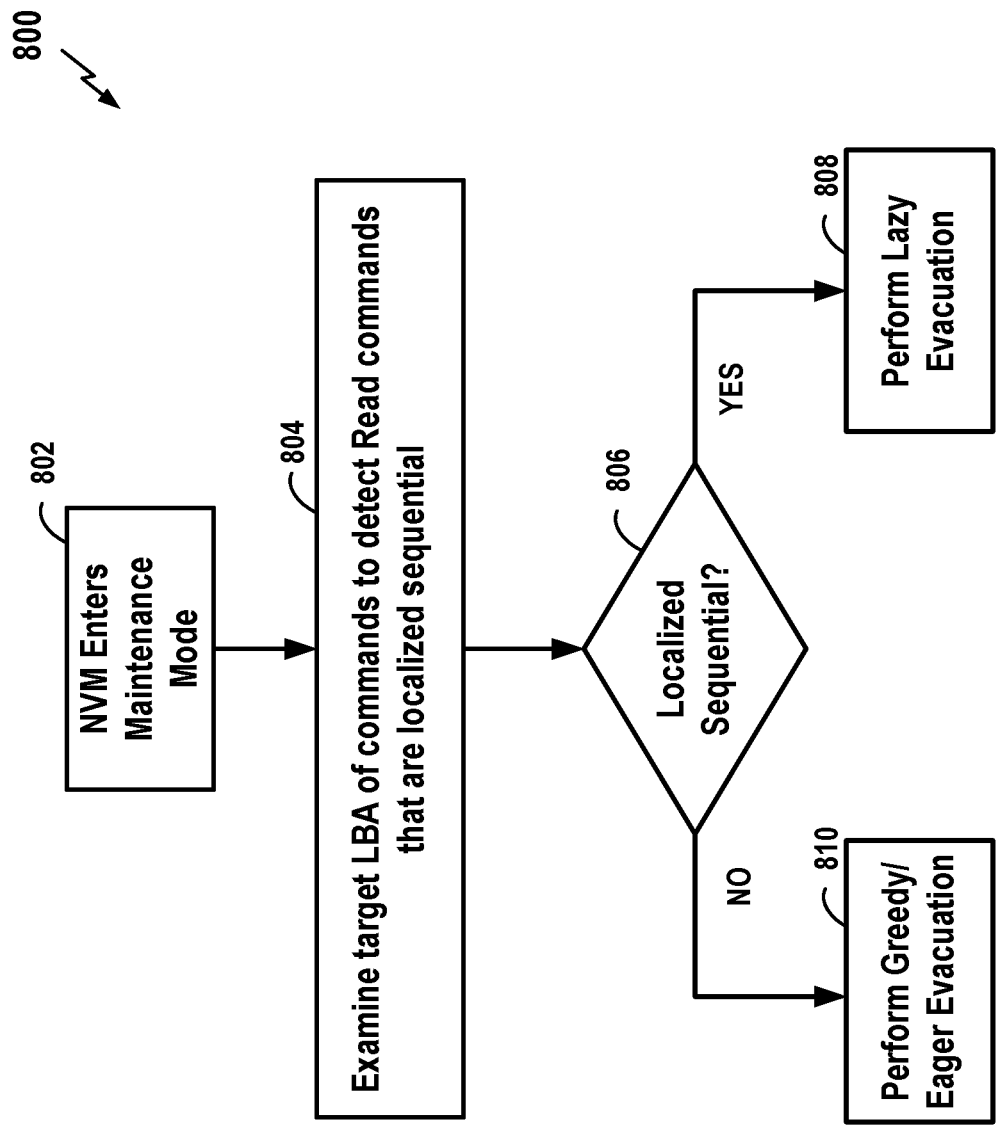
FIG. 8 is a flow chart of a process for performing evacuation based on I/O command history in accordance with another aspect of the disclosure where target logical block addresses (LBAs) are examined to determine if recent read commands are localized sequential.

FIG. 8 illustrates an alternative wherein the SSD determines whether read commands are localized sequential, indicating a higher probability of the LBA range being accessed in the near future, and then selects the lazy evacuation policy so as to retain the data in the LBA read range or otherwise reduce active evacuation. The process again begins when the SSD enters an NVM maintenance mode as indicated by block 802. The SSD controller examines/monitors the target LBA of commands as indicated by block 804 to detect read commands that are localized and sequential. (Locality may be assessed by comparing the range of the LBAs to a threshold range and designating the reads as "localized" if they are all within a threshold range and tightly localized if they are all within a narrow LBA threshold range. Sequentiality can be assessed by examining the sequence of the LBAs to determine if they are in some defined order). If localized-sequential, as determined at decision block 806, the SSD performs lazy evacuation as indicated by block 808 so as to retain the data corresponding to these reads in the higher tier memory. Otherwise, the SSD performs greedy evacuation, as indicated by block 810.

Figure 9:
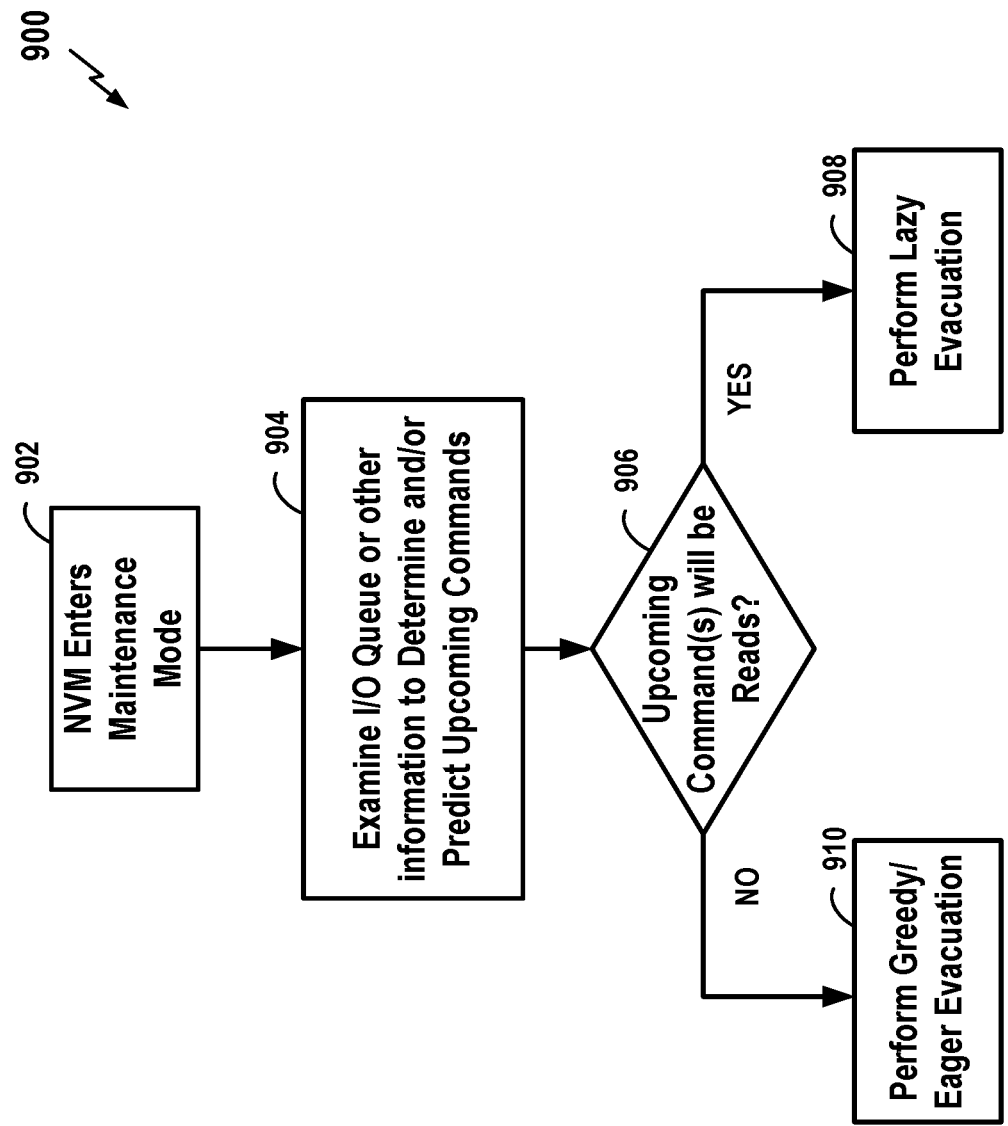
FIG. 9 is a flow chart of a process for performing evacuation based on future I/O commands in accordance with another aspect of the disclosure.

FIG. 9 is a flow chart of an exemplary process 900 for performing evacuation based on future I/O commands (e.g. commands not yet actually sent from the host to the SSD). In addition to examining historical commands, as discussed above, the SSD controller may examine other information to predict or determine future commands. In one aspect, the SSD controller can determine a future I/O command by obtaining advanced notice from the host (e.g., via access to a host command queue such as queue 208 of FIG. 2). In another aspect, the SSD controller can predict a future I/O command using prediction methods such as machine learning, pattern identification, heuristic approaches or procedures, and/or obtaining hints from the host. As at least some such techniques are known in the art, they will not be described in detail herein.

As shown in FIG. 9, the process 900 again starts after the NVM enters a maintenance mode, as indicated by block 902. The SSD controller examines/monitors the host I/O queue(s) or other information, as indicated by block 904, and determines future commands (actual or predicted). As noted, the SSD controller may determine one or more actual future commands based on an examination of entries in the host queue (if the SSD controller has access to that queue). Additionally or alternatively, the SSD controller may predict one or more future commands based on an examination of various types of information such as hints in the metadata of the I/O commands or based on a predictive analysis applied to the command history using machine learning, heuristics, etc. If the future command(s) will be a read, then the SSD may perform lazy evacuation, as indicated by block 908. If on the other hand, the future command(s) will not be reads, then the SSD may perform greedy evacuation, as indicated by block 908. The actual evacuation may be performed by the NVM of the SSD based on the selected evacuation policy.

Figure 10:
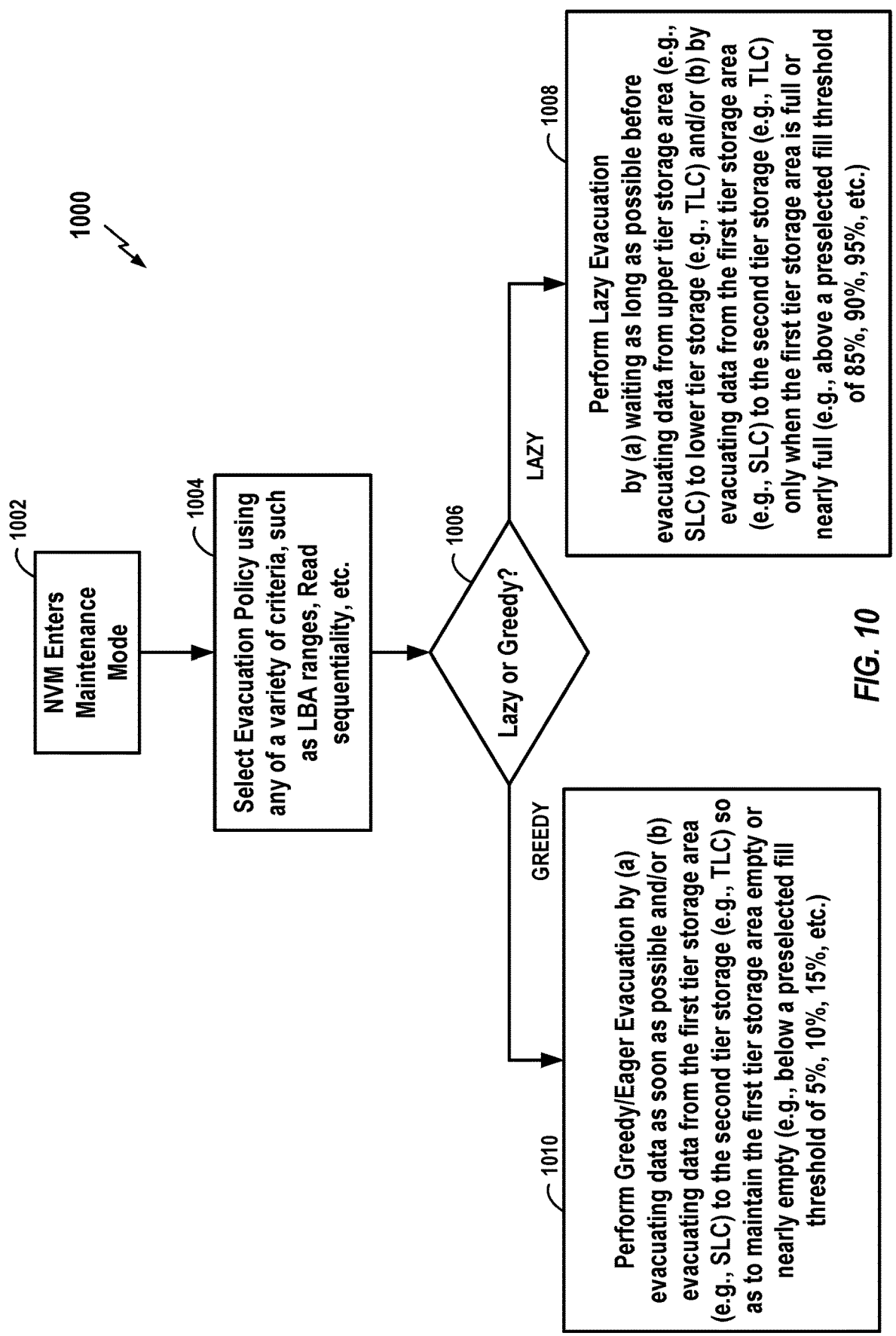
FIG. 10 is a flow chart illustrating exemplary lazy and greedy/eager evacuation policies that may be exploited.

FIG. 10 illustrates various lazy and greedy/eager evacuation policies. The process again begins when the SSD enters an NVM maintenance mode as indicated by block 1002. At block 1004, the SSD selects an evacuation policy, using any of a variety of criteria, such as the LBA ranges, read sequentiality, etc., as discussed above. If lazy is selected, as indicated by decision block 1006, the SSD performs lazy evacuation as indicated by block 1008 by (a) waiting as long as possible before evacuating data from upper tier storage area (e.g., SLC) to lower tier storage (e.g., TLC) and/or (b) by evacuating data from the first tier storage area (e.g., SLC) to the second tier storage (e.g., TLC) only when the first tier storage area is full or nearly full (e.g., above a preselected fill threshold of 85%, 90%, 95%, etc.). If greedy/eager is selected, the SSD performs greedy/eager evacuation as indicated by block 1010 by (a) evacuating data as soon as possible and/or (b) by evacuating data from the first tier storage area (e.g., SLC) to the second tier storage (e.g., TLC) so as to maintain the first tier storage area in an empty or nearly empty state (e.g., below a preselected fill threshold of 5%, 10%, 15%, etc.)

As far as performance is concerned, generally speaking, a lazy evacuation procedure tends to favor read at the expense of write. For example, a sequential one megabyte (1 MB) and random four kilobyte (4K) read performance for a 128 gigabyte (128 GB) drive may be higher when using a lazy evacuation procedure as opposed to a greedy evacuation procedure, but the write performance may suffer accordingly. The evacuation processes disclosed herein that take into account such information as whether the most recent I/O command was a read can, in some examples at least, improve 4K random read performance to be the same as the lazy evacuation procedure, while retaining the write performance of greedy evacuation. In some examples, the evacuation processes disclosed herein may not significantly improve performance for sequential data but may achieve significant performance gains for random data and/or random reads/writes. In any case, by using historical or predicted access patterns to determine evacuation strategy, the processes disclosed herein can, in at least some examples, deliver higher throughput.

Note also that synthetic benchmarks that measure performance might try to defeat the optimizations discussed above by modifying a test workload to include spurious write and/or trim commands (such as writing to invalid LBAs, trimming data before read, or writing the same data to existing LBAs) immediately before or after the idle period. The evaluator may be configured to identify such commands and ignore them in choosing its evacuation procedure.

Exemplary Method Embodiments

Figure 11:
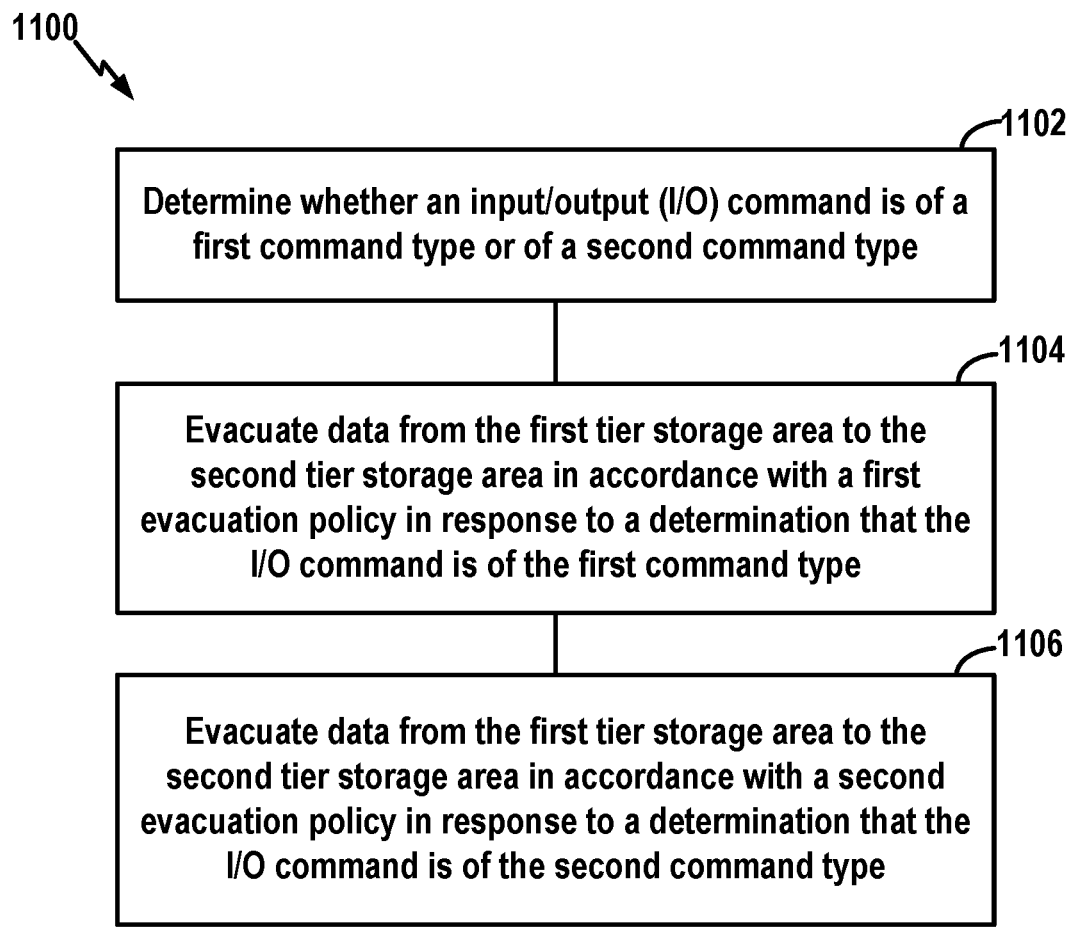
FIG. 11 is a flow chart summarizing a general exemplary method for evacuating data from a first tier storage area to a second tier storage area of an SSD.

FIG. 11 illustrates an exemplary flowchart 1100 according to an aspect of the methodology for data evacuation. The method 1100 includes, as shown at block 1102, determining whether an input/output (I/O) command is of a first command type or of a second command type. In some examples, commands of the first type are read commands, whereas commands of the second type are not read commands (e.g. write commands). In some aspects, a single I/O command is examined and its type determined. In other aspects, two or more I/O commands are examined and their types determined. In some examples, the I/O command is the most-recently executed or processed command or a group of recently executed commands. In other examples, the I/O command is a future command (or group of commands) not yet received from a host device. The method 1100 also includes, as shown at block 1104, evacuating data from the first tier storage area to the second tier storage area in accordance with a first evacuation policy in response to a determination that the I/O command is of the first command type and, as shown at block 1106, evacuating data from the first tier storage area to the second tier storage area in accordance with a second evacuation policy in response to a determination that the I/O command is of the second command type.

In some examples, the first evacuation policy is a lazy or relatively non-aggressive evacuation policy (as discussed above), whereas the second evacuation policy is a greedy or relatively aggressive evacuation policy (as discussed above). It is noted that, although block 1106 is shown following block 1108 in the illustration of FIG. 11, the operations of blocks 1106 and 1108 need not be performed in any particular order. In some examples, depending upon a particular sequence of I/O commands, an evacuation procedure in accordance with the second evacuation policy may be performed before an evacuation procedure in accordance with the first evacuation policy. In other examples, only one type of evacuation procedure might be performed (such as if, for example, the criteria for using the second evacuation policy are not met).

Figure 12:
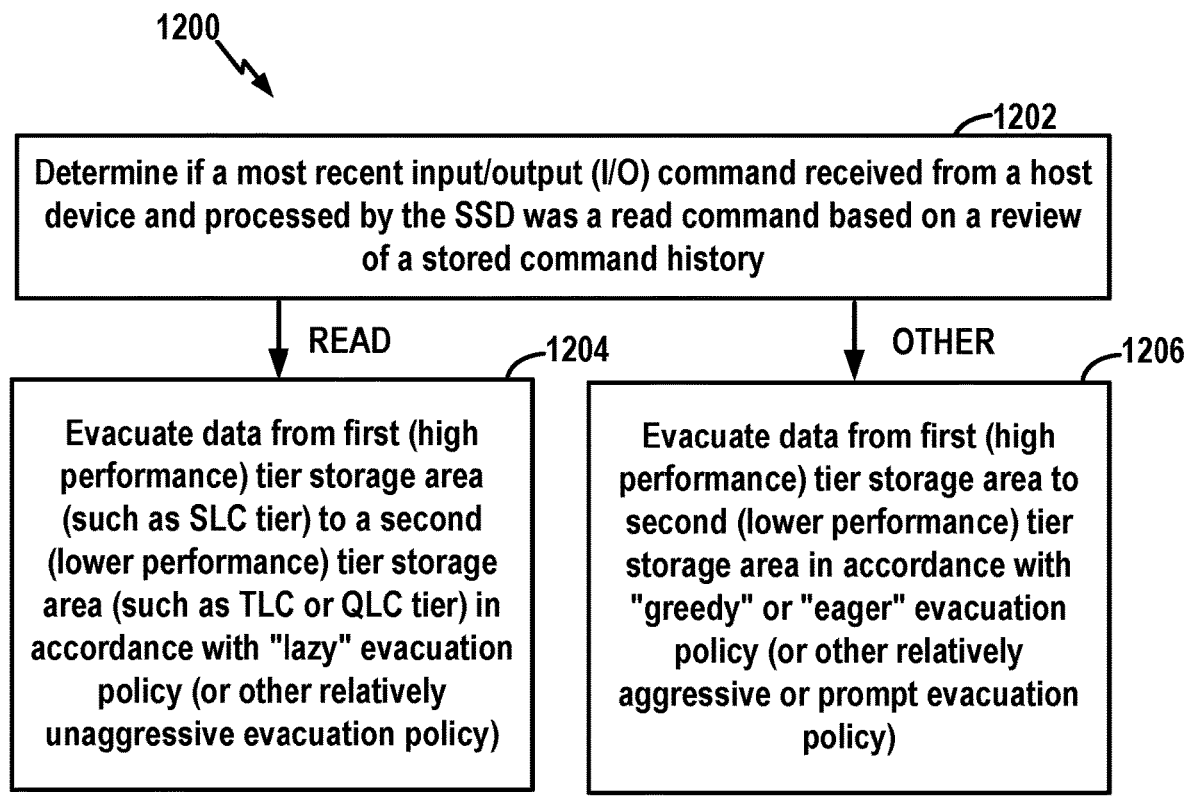
FIG. 12 is a flow chart summarizing an exemplary method for lazy vs. greedy evacuation of data based on a review of a stored command history.

FIG. 12 illustrates an exemplary flowchart 1200 according to an aspect of the methodology for data evacuation employing last vs. greedy procedures. The method 1200 includes, as shown at block 1202, determining if a most recent I/O command received from a host device and processed by the SSD was a read command based on a review of a stored command history. The method 1200 also includes, as shown at block 1204, evacuating data from a first (high performance) tier storage area (such as an SLC tier) to a second (lower performance) tier storage area (such as a TLC or QLC tier) in accordance with a "lazy" evacuation policy (or other relatively unaggressive evacuation policy) if the I/O command was a read command. Still further, the method 1200 includes, as shown at block 1206, evacuating data from the first (high performance) tier storage area to the second (lower performance) tier storage area in accordance with a "greedy" evacuation policy (or other relatively aggressive evacuation policy) if the I/O command was not a read command (i.e. it was some other command, as indicated). The operations of blocks 1206 and 1208 of FIG. 12 need not be performed in any particular order and are shown side-by-side in the figure to indicate that the operations may be performed in the alternative.

Figure 13:
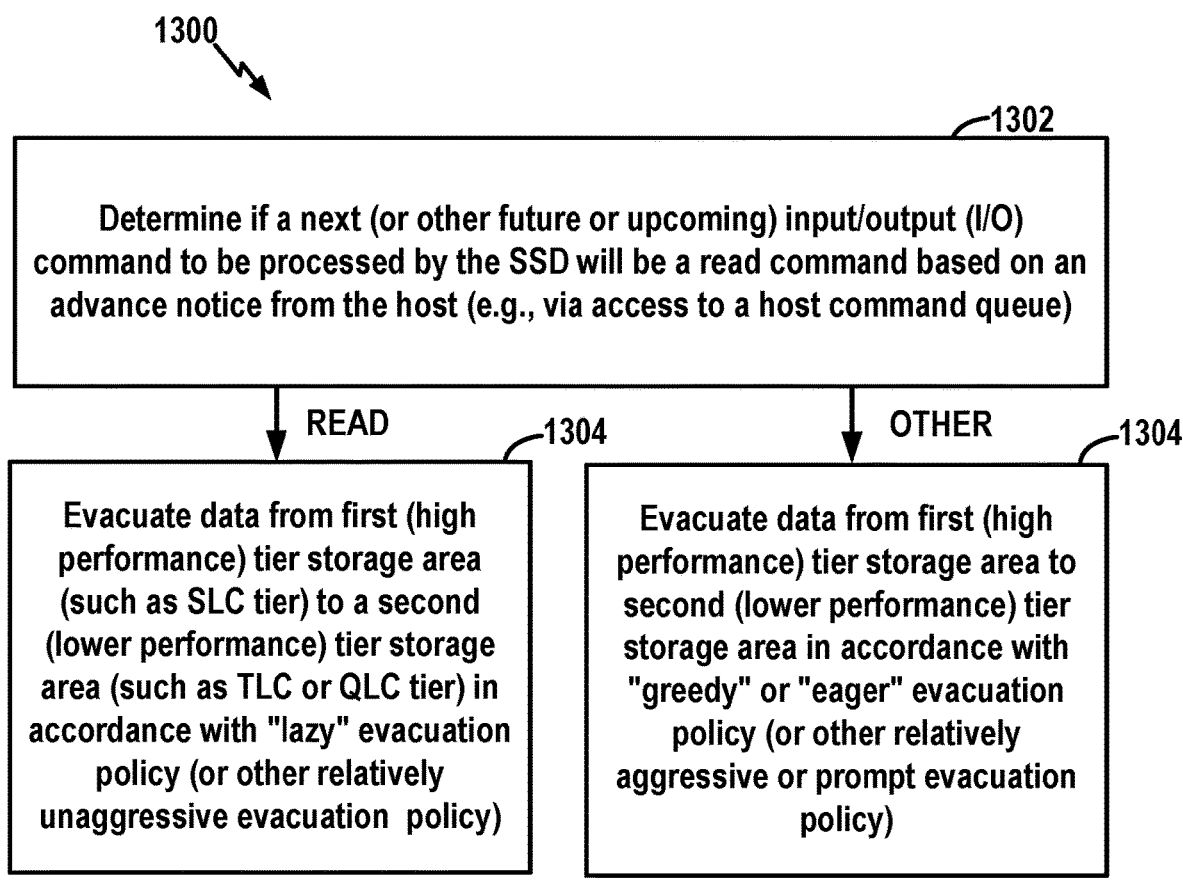
FIG. 13 is a flow chart summarizing an exemplary method for evacuating data from a first tier storage area to a second tier storage area based on a notification of future commands.

FIG. 13 illustrates an exemplary flowchart 1300 according to an aspect of the methodology for data evacuation based on a notification of future commands. The method 1300 includes, as shown at block 1302, determining if a next (or other future or upcoming) I/O command to be processed by the SSD will be a read command based on an advance notice from the host (e.g., via access to a host command queue). The method 1300 also includes, as shown at block 1304, evacuating data from a first (high performance) tier storage area (such as an SLC tier) to a second (lower performance) tier storage area (such as a TLC or QLC tier) in accordance with a lazy evacuation policy if the future (e.g. next) I/O command will be a read command. Still further, the method 1300 includes, as shown at block 1306, evacuating data from the first (high performance) tier storage area to the second (lower performance) tier storage area in accordance with a greedy evacuation policy if the future (e.g. next) I/O command will not be a read command (i.e. it will be some other command, such as a write command). As with similar blocks in FIG. 8, the operations of blocks 1304 and 1306 of FIG. 13 need not be performed in any particular order and are shown side-by-side to indicate the operations may be performed in the alternative.

Figure 14:
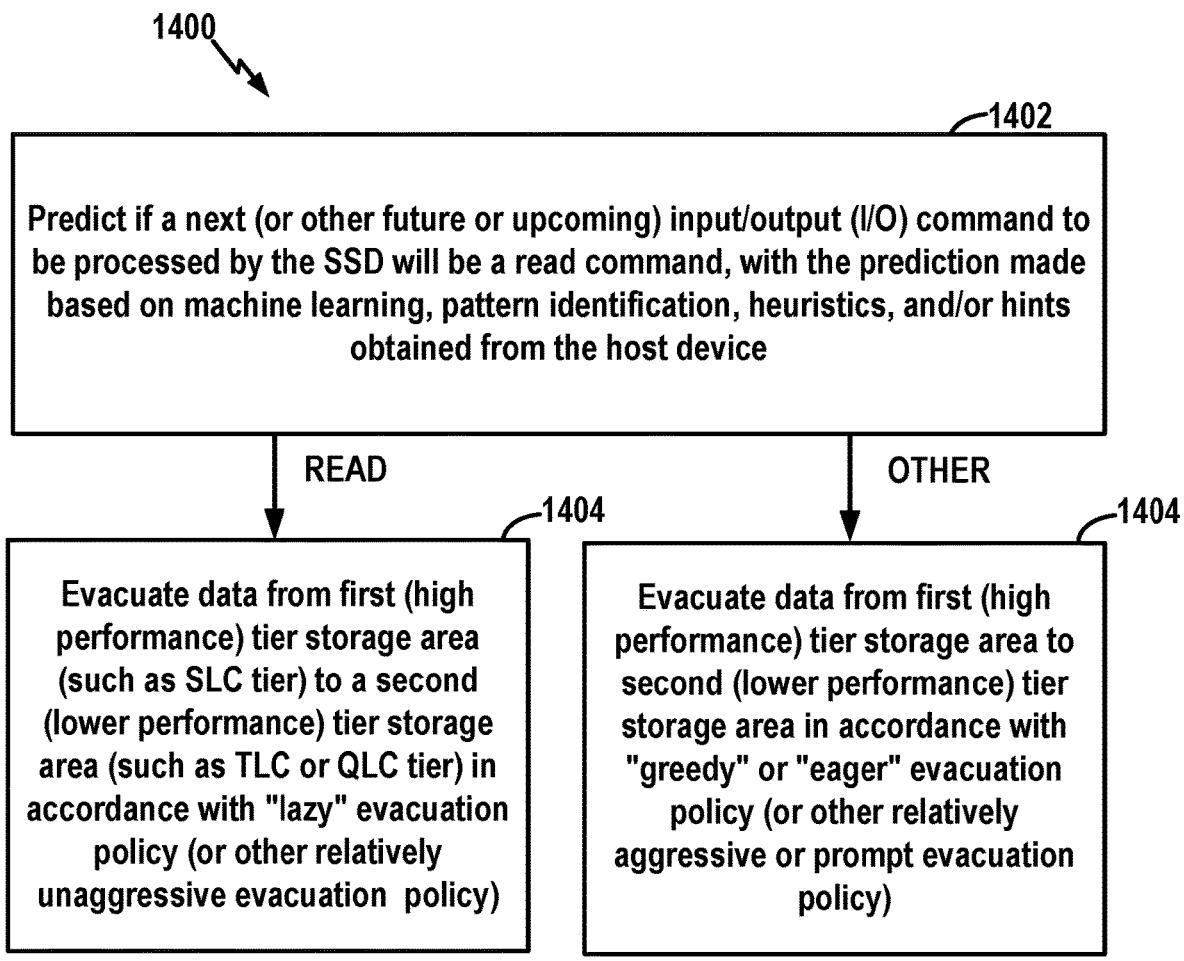
FIG. 14 is a flow chart summarizing an exemplary method for evacuating data from a first tier storage area to a second tier storage area based on a prediction of future commands.

FIG. 14 illustrates an exemplary flowchart 1400 according to an aspect of the methodology for data evacuation based on a prediction of future commands. The method 1400 includes, as shown at block 1402, predicting if a next (or other future or upcoming) I/O command to be processed by the SSD will be a read command based on machine learning, pattern identification, heuristics, and/or hints obtained from the host device. Machine learning may include neural network processing, including using learned values obtained using crowd-sourcing learning. Heuristics may be applied to file system structures and the like. The method 1400 also includes, as shown at block 1404, evacuating data from a first (high performance) tier storage area (such as an SLC tier) to a second (lower performance) tier storage area (such as a TLC or QLC tier) in accordance with a lazy evacuation policy if the predicted I/O command will be a read command. Still further, the method 1400 includes, as shown at block 1406, evacuating data from the first (high performance) tier storage area to the second (lower performance) tier storage area in accordance with a greedy evacuation policy if the predicted I/O command will not be a read command (e.g. a write command). As with similar blocks in FIGS. 8 and 9, the operations of blocks 1404 and 1406 of FIG. 14 need not be performed in any particular order and are shown side-by-side to indicate the operations may be performed in the alternative.

Figure 15:
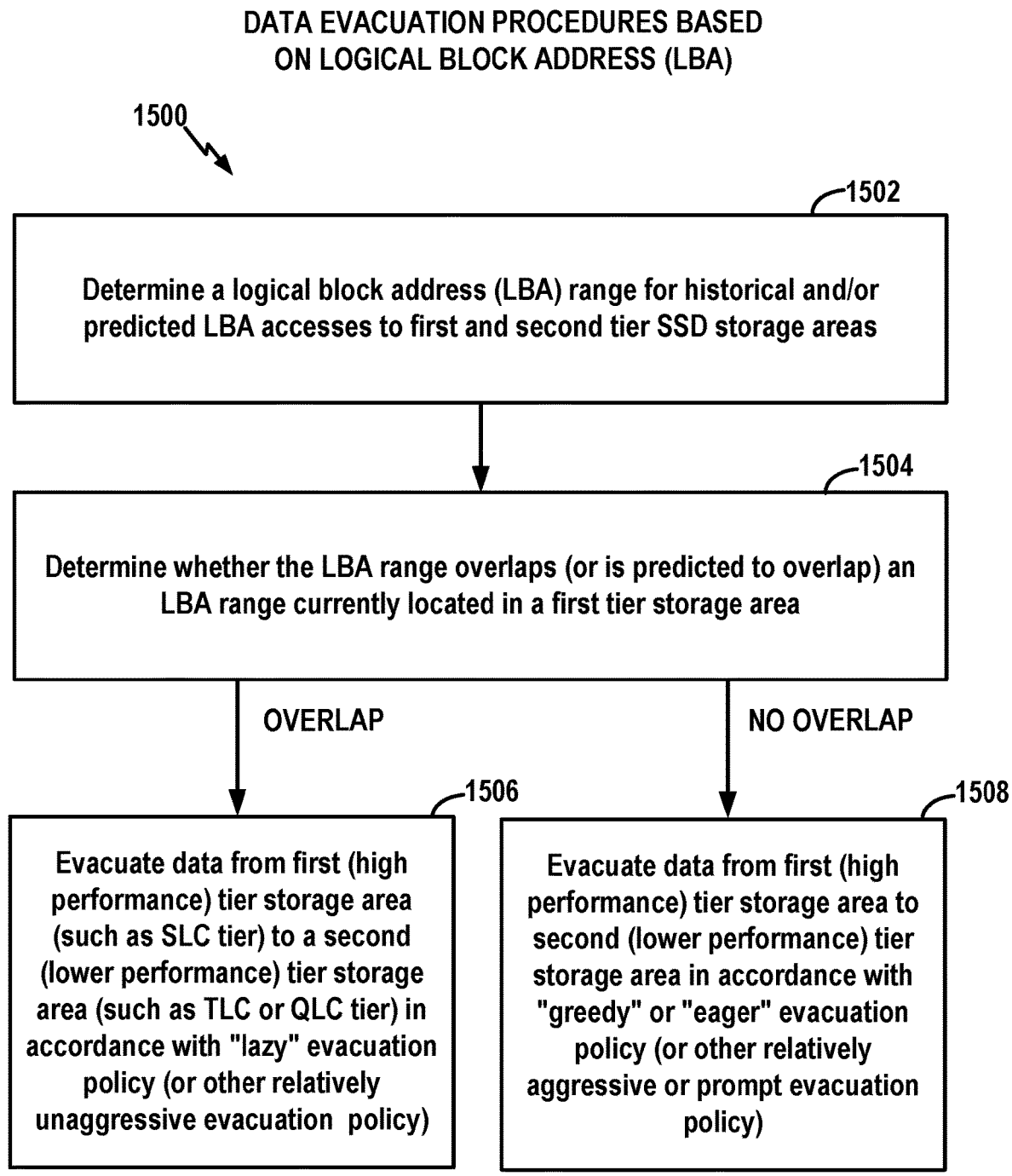
FIG. 15 is a flow chart summarizing an exemplary method for evacuating data from a first tier storage area to a second tier storage area based on LBA overlap.

FIG. 15 illustrates an exemplary flowchart 1500 according to an aspect of the methodology for data evacuation based on LBAs. The method 1500 includes, as shown at block 1502, determining an LBA range for historical and/or predicted LBA accesses to first and second tier SSD storage areas. The method 1500 also includes, as shown at block 1504, determining whether the LBA range overlaps (or is predicted to overlap) an LBA range currently located in a first tier storage area. The method 1500 further includes, as shown at block 1506, evacuating data from the first (high performance) tier storage area (such as an SLC tier) to a second (lower performance) tier storage area (such as a TLC or QLC tier) in accordance with a lazy evacuation policy if there is (or will be) an LBA range overlap. Still further, the method 1500 includes, as shown at block 1508, evacuating data from the first (high performance) tier storage area to the second (lower performance) tier storage area in accordance with a greedy evacuation policy if there is (or will be) no LBA range overlap. In this manner, the evaluator may take into account the LBA ranges of historical or predicted LBA accesses in order to detect whether the LBA range overlaps or is predicted to overlap with the LBA range currently located in the upper tier of non-volatile storage. In such case, the evaluator may stick with lazy evacuation. As with FIGS. 8-10, the operations of blocks 1506 and 1508 of FIG. 15 need not be performed in any particular order and are shown side-by-side to indicate the operations may be performed in the alternative.

Figure 16:
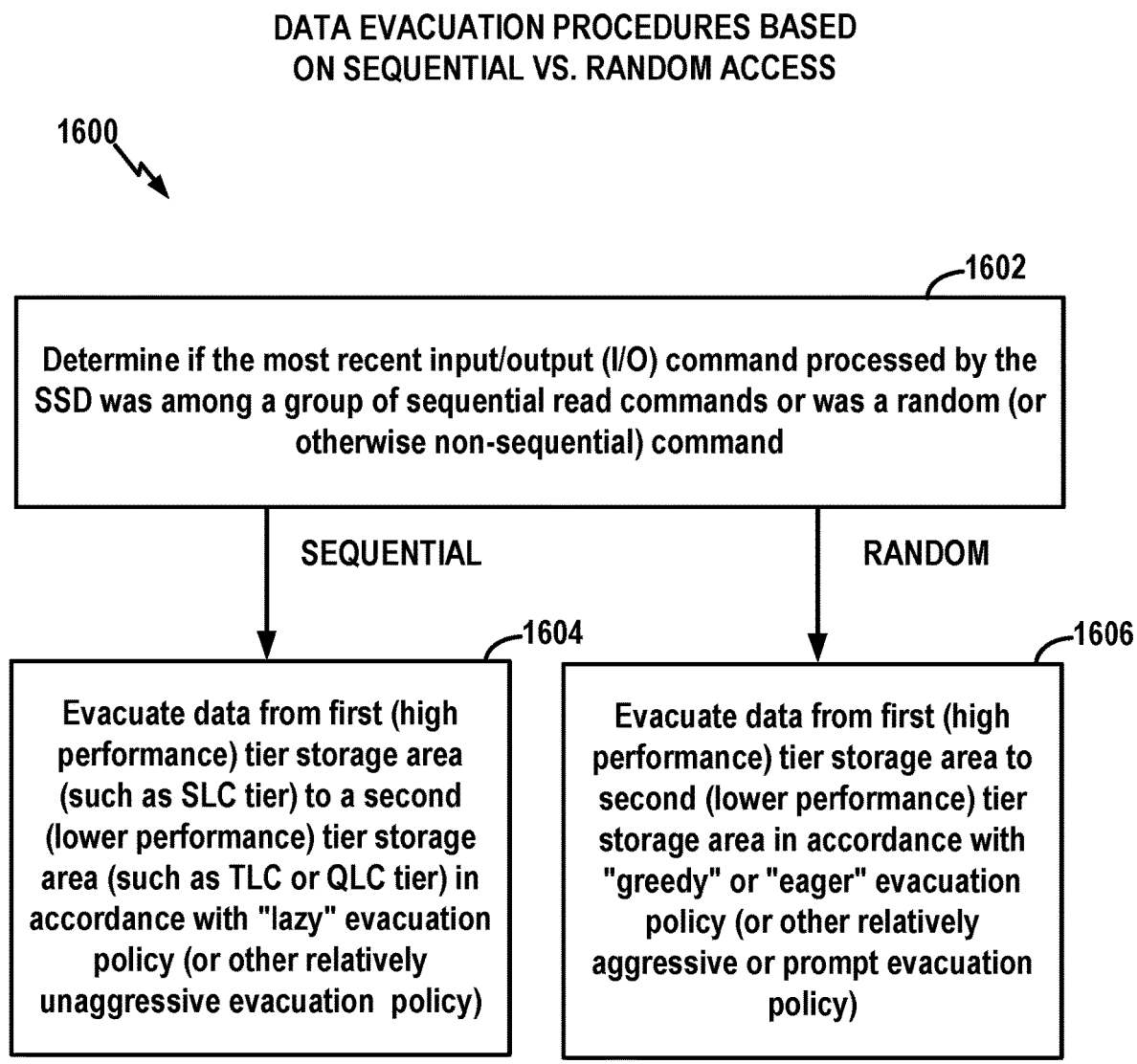
FIG. 16 is a flow chart summarizing an exemplary method for evacuating data from a first tier storage area to a second tier storage area based sequential vs. random access commands.

FIG. 16 illustrates an exemplary flowchart 1600 according to an aspect of the methodology for data evacuation based on sequential vs. random access. Random accesses may benefit more from lazy evacuation than sequential accesses. The method 1600 includes, as shown at block 1602, determining if the most recent I/O command processed by the SSD was among a group of sequential read commands or was a random (or otherwise non-sequential) command. The method 1600 also includes, as shown at block 1604, evacuating data from a first (high performance) tier storage area (such as an SLC tier) to a second (lower performance) tier storage area (such as a TLC or QLC tier) in accordance with a lazy evacuation policy if the I/O command was among a group of sequential commands. Still further, the method 1600 includes, as shown at block 1606, evacuating data from the first (high performance) tier storage area to the second (lower performance) tier storage area in accordance with a greedy evacuation policy if the I/O command was random (or otherwise non-sequential). As with similar blocks in FIGS. 8-11, the operations of blocks 1604 and 1606 need not be performed in any particular order and are shown side-by-side as they may be performed in the alternative.

Exemplary Apparatus Embodiments

Figure 17:
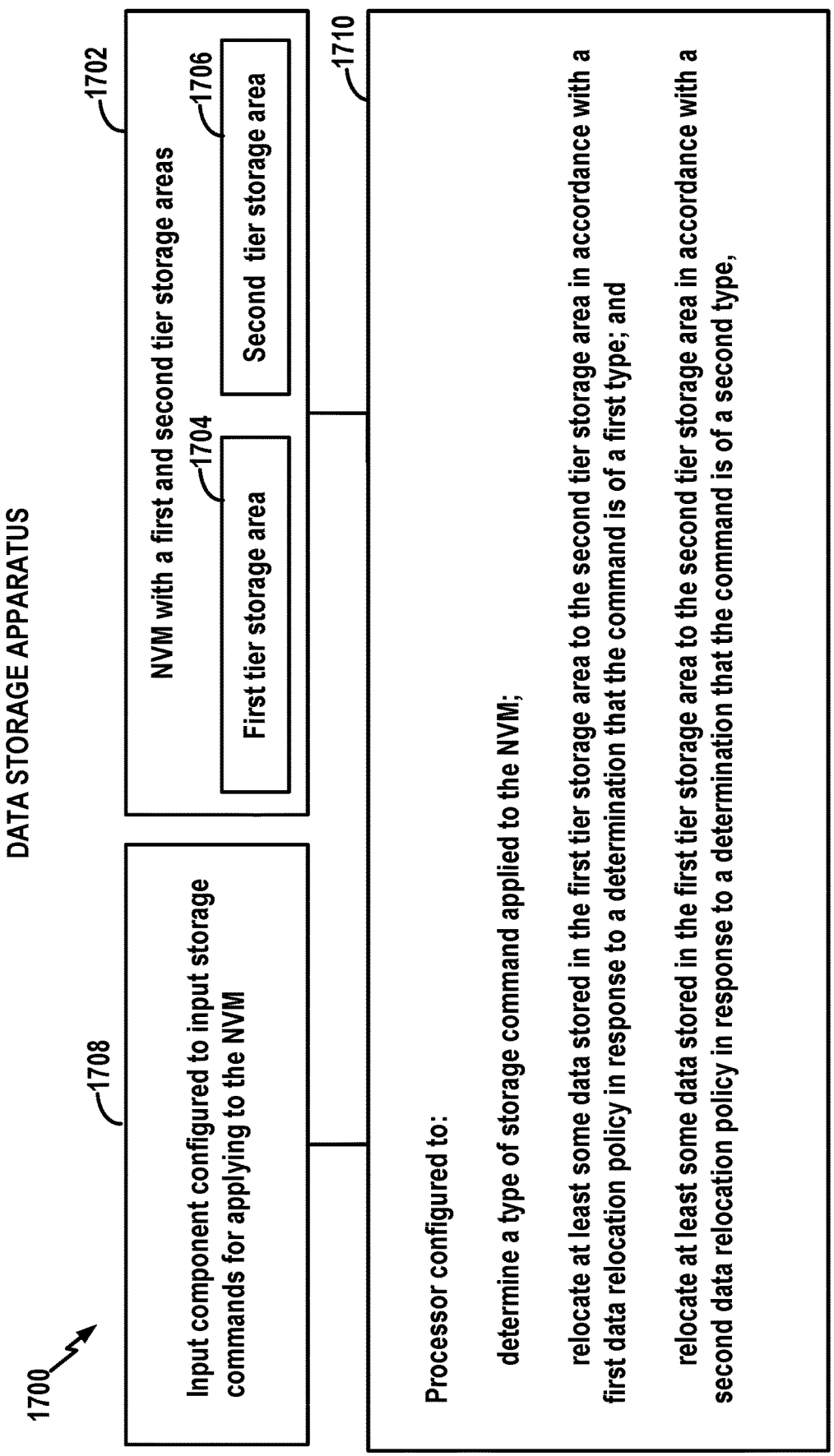
FIG. 17 is a block diagram of an exemplary data storage apparatus with a processor configured to use different data relocation (evacuation) policies.

FIG. 17 illustrates an exemplary apparatus 1700 configured according to an aspect of the disclosure herein. The apparatus 1700 includes, as shown by block 1702, an NVM having a first tier storage area 1704 and a second tier storage area 1706. The first tier storage area may be, for example, a high performance SLC storage area, whereas the second tier storage area may be, for example, a lower performance TLC storage area. The apparatus 1700 also includes, as shown by block 1708, an input component configured to input storage commands for applying to the NVM, such as commands from a host device (not shown in FIG. 17). The apparatus 1700 further includes, as shown by block 1710, a processor coupled to the NVM and the input component and configured to: determine a type of storage command applied to the NVM; relocate at least some data stored in the first tier storage area to the second tier storage area in accordance with a first data relocation policy in response to a determination that the command is of a first type; and relocate at least some data stored in the first tier storage area to the second tier storage area in accordance with a second data relocation policy in response to a determination that the command is of a second type.

Figure 18:
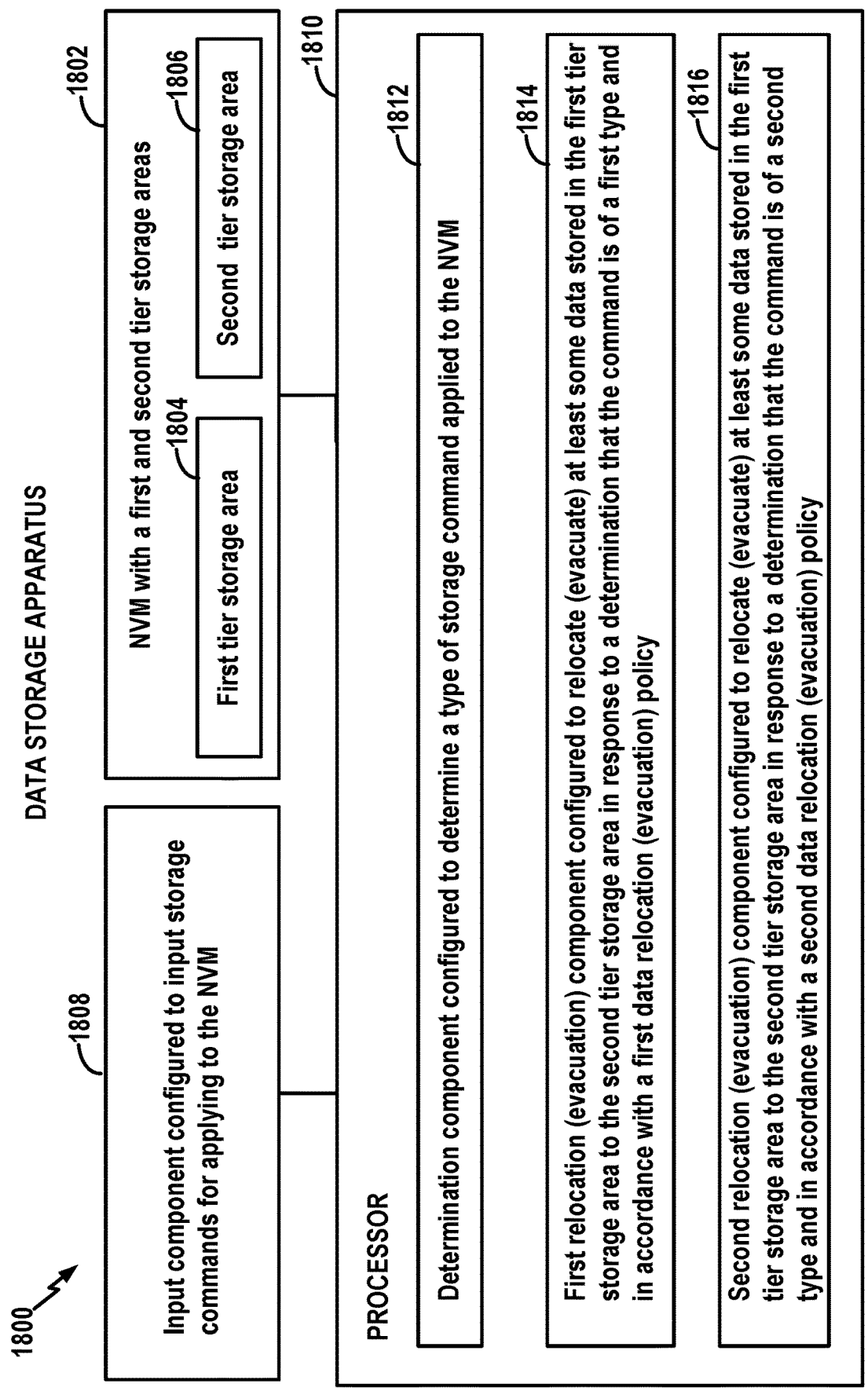
FIG. 18 is a block diagram of an exemplary data storage apparatus with a processor configured with components for implementing different data relocation (evacuation) policies.

FIG. 18 illustrates an exemplary apparatus 1800 configured according to an aspect of the disclosure herein. The apparatus 1800 includes, as shown by block 1802, an NVM having a first tier storage area 1804 and a second tier storage area 1806. The apparatus 1800 also includes, as shown by block 1808, an input component configured to input storage commands for applying to the NVM, such as commands from a host device (not shown in FIG. 18). The apparatus 1800 further includes, as shown by block 1810, a processor coupled to the NVM and the input component. In the example of FIG. 18, the processor 1800 includes: a determination component 1812 configured to determine a type of storage command applied to the NVM; a first relocation (evacuation) component configured to relocate at least some data stored in the first tier storage area to the second tier storage area in response to a determination that the command is of a first type and in accordance with a first data relocation policy; and a second relocation (evacuation) component configured to relocate at least some data stored in the first tier storage area to the second tier storage area in response to a determination that the previous command is of a second type and in accordance with a second data relocation policy.

Figure 19:
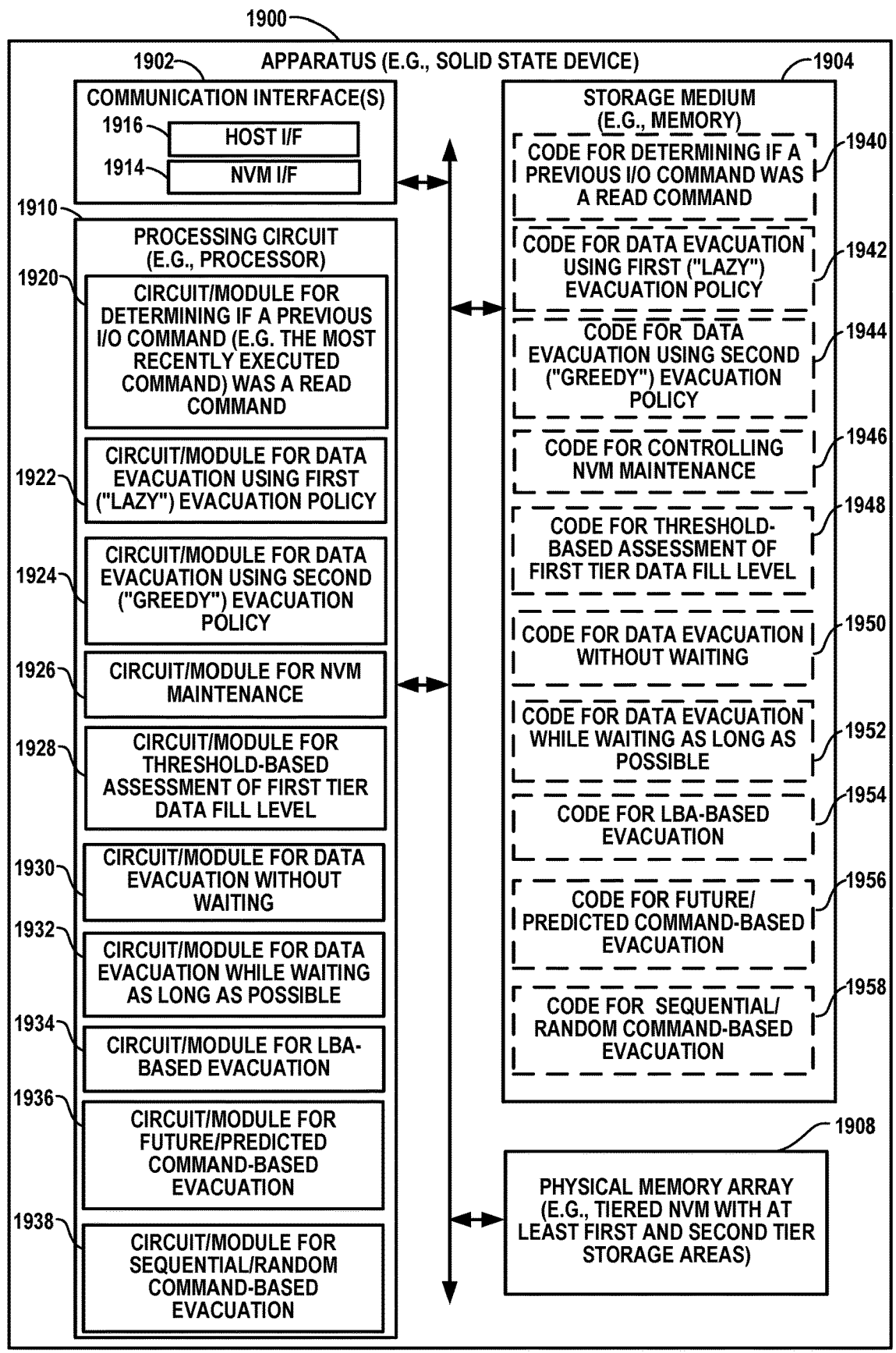
FIG. 19 is a block diagram of an exemplary data storage apparatus (e.g. SSD) illustrating various internal components in greater detail.

FIG. 19 illustrates an embodiment of an apparatus 1900 that provides additional exemplary detail and is configured according to one or more aspects of the disclosure. The apparatus 1900, or components thereof, could embody or be implemented within an SSD controller, a host device, an NVM device, a NAND die, or some other type of device that supports data storage. In various implementations, the apparatus 1900, or components thereof, could embody or be implemented within a computing device, a personal computer, a portable device, or workstation, a server, a personal digital assistant, a digital camera, a digital phone, an entertainment device, a medical device, or any other electronic device that stores data.

The apparatus 1900 includes a communication interface 1902, a storage medium 1904, a physical memory array (e.g., a tiered NVM memory circuit) 1908, and a processing circuit 1910 (e.g., at least one processor and/or other suitable circuitry). These components can be coupled to and/or placed in electrical communication with one another via a signaling bus or other suitable component, represented generally by the connection lines in FIG. 19. The signaling bus may include any number of interconnecting buses and bridges depending on the specific application of the processing circuit 1910 and the overall design constraints. The signaling bus links together various circuits such that each of the communication interface 1902, the storage medium 1904, and the memory array 1908 are coupled to and/or in electrical communication with the processing circuit 1910. The signaling bus may also link various other circuits (not shown) such as timing sources, peripherals, voltage regulators, and power management circuits, which are well known in the art, and will not be described any further.

The communication interface 1902 provides a means for communicating with other apparatuses over a transmission medium. In some implementations, the communication interface 1902 includes circuitry and/or programming (e.g., a program) adapted to facilitate the communication of information bi-directionally with respect to one or more devices in a system. In some implementations, the communication interface 1902 may be configured for wire-based communication. For example, the communication interface 1902 could be a bus interface, a send/receive interface, or some other type of signal interface including drivers, buffers, or other circuitry for outputting and/or obtaining signals (e.g., outputting signal from and/or receiving signals into an integrated circuit). The communication interface 1902 serves as one example of a means for receiving and/or a means for transmitting.

The memory array 1908 may represent one or more tiered memory devices. In some implementations, the memory array 1908 and the storage medium 1904 are implemented as a common memory component. The memory array 1908 may be used for storing data that is manipulated by the processing circuit 1910 or some other component of the apparatus 1900. In the example of FIG. 19, the memory array 1908 includes at least first and second tier storage areas, such as an SLC area and a TLC area.

The storage medium 1904 may represent one or more computer-readable, machine-readable, and/or processor-readable devices for storing programming, such as processor executable code or instructions (e.g., software, firmware), electronic data, databases, or other digital information. The storage medium 1904 may also be used for storing data that is manipulated by the processing circuit 1910 when executing programming. The storage medium 1904 may be any available media that can be accessed by a general purpose or special purpose processor, including portable or fixed storage devices, optical storage devices, and various other mediums capable of storing, containing or carrying programming.

By way of example and not limitation, the storage medium 1904 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 1904 may be embodied in an article of manufacture (e.g., a computer program product). By way of example, a computer program product may include a computer-readable medium in packaging materials. In view of the above, in some implementations, the storage medium 1904 may be a non-transitory (e.g., tangible) storage medium. For example, the storage medium 1904 may be a non-transitory computer-readable medium storing computer-executable code, including code to perform operations as described herein.

The storage medium 1904 may be coupled to the processing circuit 1910 such that the processing circuit 1910 can read information from, and write information to, the storage medium 1904. That is, the storage medium 1904 can be coupled to the processing circuit 1910 so that the storage medium 1904 is at least accessible by the processing circuit 1910, including examples where at least one storage medium is integral to the processing circuit 1910 and/or examples where at least one storage medium is separate from the processing circuit 1910 (e.g., resident in the apparatus 1900, external to the apparatus 1900, distributed across multiple entities, etc.).

Programming stored by the storage medium 1904, when executed by the processing circuit 1910, causes the processing circuit 1910 to perform one or more of the various functions and/or process operations described herein. For example, the storage medium 1904 may include operations configured for regulating operations at one or more hardware blocks of the processing circuit 1910, as well as to utilize the communication interface 1902 for wireless communication utilizing their respective communication protocols.

The processing circuit 1910 is generally adapted for processing, including the execution of such programming stored on the storage medium 1904. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1910 is arranged to obtain, process and/or send data, control data access and storage, issue commands, and control other desired operations. The processing circuit 1910 may include circuitry configured to implement desired programming provided by appropriate media in at least one example. For example, the processing circuit 1910 may be implemented as one or more processors, one or more controllers, and/or other structure configured to execute executable programming. Examples of the processing circuit 1910 may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1910 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 1910 are for illustration and other suitable configurations within the scope of the disclosure are also contemplated.

According to one or more aspects of the disclosure, the processing circuit 1910 may be adapted to perform any or all of the features, processes, functions, operations and/or routines for any or all of the apparatuses described herein. For example, the processing circuit 1910 may be configured to perform any of the steps, functions, and/or processes described with respect to FIGS. 1-18. As used herein, the term "adapted" in relation to the processing circuit 1910 may refer to the processing circuit 1910 being one or more of configured, employed, implemented, and/or programmed to perform a particular process, function, operation and/or routine according to various features described herein. The processing circuit 1910 may be a specialized processor, such as an ASIC that serves as a means for (e.g., structure for) carrying out any one of the operations described in conjunction with FIGS. 1-18. The processing circuit 1910 serves as one example of a means for sending and/or a means for receiving. In various implementations, the processing circuit 1910 may provide and/or incorporate, at least in part, the functionality described above for the controller 108 of FIG. 1.

According to at least one example of the apparatus 1900, the processing circuit 1910 may include one or more of: a circuit/module 1920 configured for determining if a previous I/O command (e.g. the most-recently executed command) was a read command; a circuit/module 1922 for data evacuation using first ("lazy") evacuation policy; a circuit/module 1924 for data evacuation using second ("greedy") evacuation policy; a circuit/module 1926 for NVM maintenance (which may control or trigger the various evacuation procedures discussed herein); a circuit/module 1928 for threshold-based assessment of first tier data fill level (to determine, for example, were the first tier is full or mostly full, as discussed above); a circuit/module 1930 for data evacuation without waiting (in accordance with one example of greedy evacuation); a circuit/module 1932 for data evacuation while waiting as long as possible (in accordance with one example of lazy evacuation); a circuit/module 1934 for LBA-based evacuation (to, for example, select the evacuation policy based on LBA overlap); a circuit/module 1936 for future/predicted command-based evacuation (to, for example, select the evacuation policy based on whether a future/predicted command will be a read command); and a circuit/module 1938 for sequential/random command-based evacuation (to, for example, select the evacuation policy based on whether a future/predicted command will be a read command).

As mentioned above, a program stored by the storage medium 1904, when executed by the processing circuit 1910, causes the processing circuit 1910 to perform one or more of the various functions and/or process operations described herein. For example, the program may cause the processing circuit 1910 to perform the various functions, steps, and/or processes described herein with respect to FIGS. 1-18 in various implementations. As shown in FIG. 19, the storage medium 1904 may include one or more of: code 1940 for determining if a previous I/O command (e.g. the most-recently executed command) was a read command; code 1942 for data evacuation using first ("lazy") evacuation policy; code 1944 for data evacuation using second ("greedy") evacuation policy; code 1946 for controlling NVM maintenance (which may control or trigger the various evacuation procedures discussed herein); code 1948 for threshold-based assessment of first tier data fill level (to determine, for example, were the first tier is full or mostly full, as discussed above); code 1950 for data evacuation without waiting (in accordance with one example of greedy evacuation); code 1952 for data evacuation while waiting as long as possible (in accordance with one example of lazy evacuation); code 1954 for LBA-based evacuation (to, for example, select the evacuation policy based on LBA overlap); code 1956 for future/predicted command-based evacuation (to, for example, select the evacuation policy based on whether a future/predicted command will be a read command); and code 1958 for sequential/random command-based evacuation (to, for example, select the evacuation policy based on whether a future/predicted command will be a read command).

In at least some examples, means may be provided for performing the functions illustrated in FIG. 19 and/or other functions illustrated or described herein. For example, the means may include one or more of: means, such as circuit/module 1920, for determining if a previous I/O command (e.g. the most-recently executed command) was a read command; means, such as circuit/module 1922, for data evacuation using first ("lazy") evacuation policy; means, such as circuit/module 1924, for data evacuation using second ("greedy") evacuation policy; means, such as circuit/module 1926 for NVM maintenance (which may control or trigger the various evacuation procedures discussed herein); means, such as circuit/module 1928, for threshold-based assessment of first tier data fill level (to determine, for example, were the first tier is full or mostly full, as discussed above); means, such as circuit/module 1930, for data evacuation without waiting (in accordance with one example of greedy evacuation); means, such as circuit/module 1932, for data evacuation while waiting as long as possible (in accordance with one example of lazy evacuation); means, such as circuit/module 1934, for LBA-based evacuation (to, for example, select the evacuation policy based on LBA overlap); means, such as circuit/module 1936, for future/predicted command-based evacuation (to, for example, select the evacuation policy based on whether a future/predicted command will be a read command); and means, such as circuit/module 1938, for sequential/random command-based evacuation (to, e.g., select the evacuation policy based on whether a future/predicted command will be a read command).

Still further, the means may include one or more of: means, such as circuit/modules 1920 and 1936, for determining if one or more input/output (I/O) commands for processing by the SSD were or will be read commands; means, such as circuit/module 1922, operative in response to a determination that the one or more I/O commands were or will be read commands, for relocating data from the first tier storage area to the second tier storage area in accordance with a first policy; and means, such as circuit/module 1924, operative in response to a determination that the one or more previous commands were not or will not be read commands, for relocating data from the first tier storage area to the second tier storage area in accordance with a second evacuation policy.

Additional Aspects

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the z direction) with each column having multiple memory elements in each column. The columns may be arranged in a two dimensional configuration, e.g., in an x-y plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-y) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC) Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:
1. A data storage apparatus comprising:
a non-volatile memory (NVM) comprising a first tier storage area and a second tier storage area;
a host interface configured to receive commands for the NVM; and
a processor coupled to the NVM and the host interface and configured to implement a first data relocation policy and a second data relocation policy,
relocate data stored in the first tier storage area to the second tier storage area in accordance with the second data relocation policy in response to detecting a sequence of write commands,
switch from the second data relocation policy to the first data relocation policy to relocate other data stored in the first tier storage area to the second tier storage area in accordance with the first data relocation policy in response to detecting a read command following the sequence of write commands, and
switch back from the first data relocation policy to the second data relocation policy in response to detecting another sequence of write commands.

2. The data storage apparatus of claim 1, wherein the processor is further configured to relocate the data from the first tier storage area to the second tier storage area by evacuating the data from the first tier storage area to the second tier storage area, and wherein the first data relocation policy is a first evacuation policy and the second data relocation policy is a second evacuation policy.

3. The data storage apparatus of claim 2, wherein the processor is further configured in accordance with the first evacuation policy to wait before evacuating the data from the first tier storage area to the second tier storage area.

4. The data storage apparatus of claim 3, wherein the processor is further configured in accordance with the first evacuation policy to wait until the first tier storage area is full before evacuating the data from the first tier storage area to the second tier storage area.

5. The data storage apparatus of claim 2, wherein the processor is further configured in accordance with the first evacuation policy to evacuate the data from the first tier storage area to the second tier storage area only after an amount of the data in the first tier storage area exceeds a first threshold.

6. The data storage apparatus of claim 2, wherein the processor is further configured in accordance with the second evacuation policy to evacuate the data from the first tier storage area to the second tier storage area without waiting.

7. The data storage apparatus of claim 2, wherein the processor is further configured in accordance with the second evacuation policy to evacuate the data from the first tier storage area to the second tier storage area so that an amount of remaining data in the first tier storage area falls below a second threshold.

8. The data storage apparatus of claim 1, wherein the first tier storage area comprises single level cells (SLCs) and the second tier storage area comprises multi-level cells (MLCs).

9. The data storage apparatus of claim 1, wherein processor is further configured so that the data is transferred from the first tier storage area to the second tier storage area under the second data relocation policy more promptly than the other data is transferred from the first tier storage area to the second tier storage area under the first data relocation policy.

10. The data storage apparatus of claim 1, wherein the NVM further comprises a third tier storage area, and wherein the processor is further configured to relocate at least some data stored in the second tier storage area to the third tier storage area in accordance with either the first data relocation policy or the second data relocation policy.

11. A method for use by a data storage device, the method comprising:
detecting a sequence of commands applied to a non-volatile memory (NVM) comprising a first tier storage area and a second tier storage area;
evacuating data from the first tier storage area to the second tier storage area in accordance with a second evacuation policy of first and second evacuation policies in response to detecting a sequence of write commands;
evacuating other data from the first tier storage area to the second tier storage area in accordance with the first evacuation policy in response to detecting a read command following the sequence of write commands; and
evacuating still other data from the first tier storage area to the second tier storage area in accordance with the second evacuation policy in response to detecting another sequence of write commands.

12. The method of claim 11, wherein the first evacuation policy comprises a less aggressive evacuation policy as compared to the second evacuation policy.

13. The method of claim 11, wherein the method further comprises:
   determining whether a future command will be a read command;
   in response to determining that the future command will be a read command, evacuating additional data from the first tier storage area to the second tier storage area in accordance with the first evacuation policy; and
   in response to determining that the future command will not be a read command, evacuating the additional data from the first tier storage area to the second tier storage area in accordance with the second evacuation policy.

14. The method of claim 13, wherein determining whether the future command will be a read command comprises one of: (a) receiving an advance notification from a host that the future command will be a read command, and (b) predicting whether the future command will be a read command without receiving advance notification from the host.

15. The method of claim 11, further comprising:
   determining a logical block address (LBA) range for predicted LBA accesses to the NVM;
   determining whether the LBA range is predicted to overlap an LBA range currently located in the first tier storage area;
   in response to determining that the LBA range is predicted to overlap the LBA range currently located in the first tier storage area, evacuating additional data from the first tier storage area to the second tier storage area in accordance with the first evacuation policy; and
   in response to determining that the LBA range is not predicted to overlap the LBA range currently located in the first tier storage area, evacuating the additional data from the first tier storage area to the second tier storage area in accordance with the second evacuation policy.

16. The method of claim 11, wherein the data is transferred from the first tier storage area to the second tier storage area under the second evacuation policy more promptly than the other data is transferred from the first tier storage area to the second tier storage area under the first evacuation policy.

17. The method of claim 11, wherein the first tier storage area comprises single level cells (SLCs) and the second tier storage area comprises multi-level cells (MLCs) and the method includes relocating the data from the SLCs to the MLCs.

18. The method of claim 11, wherein the NVM further comprises a third tier storage area, and wherein the method further comprises evacuating at least some data stored in the second tier storage area to the third tier storage area in accordance with either the first evacuation policy or the second evacuation policy.

19. An apparatus for use with a data storage device, the apparatus comprising:
   means for detecting a sequence of commands applied to a non-volatile memory (NVM) comprising a first tier storage area and a second tier storage area;
   means, operative in response to detecting a sequence of write commands, for relocating data from the first tier storage area to the second tier storage area in accordance with a second evacuation policy of first and second evacuation policies;
   means, operative in response to detecting a read command following the sequence of write commands, for relocating other data from the first tier storage area to the second tier storage area in accordance with the first evacuation policy; and
   means, operative in response to detecting a second sequence of write commands, for relocating still other data from the first tier storage area to the second tier storage area in accordance with the second evacuation policy in response to detecting the second sequence of write commands.

20. The apparatus of claim 19, wherein the means for relocating the data from the first tier storage area to the second tier storage area in accordance with the second evacuation policy is configured to relocate the data more promptly than the means for relocating the data from the first tier storage area to the second tier storage area operates in accordance with the first evacuation policy.

* * * * *